United States Patent
Yunoki et al.

(10) Patent No.: US 10,620,635 B2
(45) Date of Patent: Apr. 14, 2020

(54) MOVING OBJECT MOVEMENT SYSTEM AND MOVEMENT PATH SELECTION METHOD

(71) Applicant: Hitachi, Ltd., Tokyo (JP)

(72) Inventors: Shoji Yunoki, Tokyo (JP); Hiroyuki Kubo, Tokyo (JP); Hideki Endo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 15/750,970

(22) PCT Filed: Nov. 5, 2015

(86) PCT No.: PCT/JP2015/081171
§ 371 (c)(1),
(2) Date: Feb. 7, 2018

(87) PCT Pub. No.: WO2017/077621
PCT Pub. Date: May 11, 2017

(65) Prior Publication Data
US 2018/0231982 A1    Aug. 16, 2018

(51) Int. Cl.
- G05D 1/02 (2020.01)
- G05D 1/00 (2006.01)
- H04L 29/08 (2006.01)

(52) U.S. Cl.
CPC ......... G05D 1/0214 (2013.01); G05D 1/0011 (2013.01); G05D 1/0022 (2013.01);
(Continued)

(58) Field of Classification Search
CPC .... G01C 21/34; G01C 21/3685; G01C 22/00; G06F 17/00; G06F 7/00; B60K 1/04;
(Continued)

(56) References Cited

U.S. PATENT DOCUMENTS

| 2006/0255955 A1* | 11/2006 | O'Connor | A61B 5/1118 |
| | | | 340/573.1 |
| 2008/0006112 A1* | 1/2008 | Mitteer | F16H 61/22 |
| | | | 74/473.1 |

(Continued)

FOREIGN PATENT DOCUMENTS

| JP | 2007-094743 A | 4/2007 |
| JP | 2011-065308 A | 3/2011 |

(Continued)

OTHER PUBLICATIONS

International Search Report of PCT/JP2015/081171 dated Dec. 22, 2015.

(Continued)

*Primary Examiner* — Behrang Badii
(74) *Attorney, Agent, or Firm* — Mattingly & Malur, PC

(57) ABSTRACT

A moving object movement system includes a moving object that moves in accordance with any one method of autonomous movement or remote controlled movement, a control server that is connected to the moving object via wireless communication, and a traveling path deciding unit that calculates an unable-to-move risk indicating a possibility that movement is unable to be performed in accordance with any one method of the autonomous movement or the remote controlled movement on the basis of map information including movement paths of the moving object, autonomous movement difficulty level information indicating a difficulty level of the autonomous movement by the moving object, and communication quality information indicating a communication quality necessary for the moving object to perform the remote controlled movement, and decides a movement path in which the calculated unable-to-move risk is smallest among the movement paths.

10 Claims, 28 Drawing Sheets

(52) U.S. Cl.
CPC ......... *G05D 1/0061* (2013.01); *G05D 1/0088* (2013.01); *G05D 1/0217* (2013.01); *G05D 1/0234* (2013.01); *G05D 1/0274* (2013.01); *G05D 1/0282* (2013.01); *H04L 67/125* (2013.01); *G05D 2201/0213* (2013.01)

(58) Field of Classification Search
CPC ...... B60L 11/1818; B60L 53/16; B60L 50/66; B61B 13/04; B61B 3/02; E05F 15/689; E05F 15/73; B62D 15/028; B62D 15/0285; G01S 7/415; G01S 13/66; G01S 13/931; B60R 25/25; B60R 25/252; B60R 25/257; A61B 5/1118; A61B 5/6828; B60C 11/24; B60C 19/00; G05D 1/0214; G05D 1/0212; G05D 3/00; G05D 1/0231; G05D 1/0011; G05D 1/0022; G05D 1/0061; G05D 1/0088; G05D 1/0217; G05D 1/0234; G05D 1/0274; G05D 1/0282; G05D 2201/0213; G08G 1/16; G08G 1/166; G08G 1/167; H01R 13/6397; H01R 13/639; B60W 30/00; B60W 30/06; H04L 67/125; B60N 2/002; B60N 2/015; B60N 2/0232; B60N 2/0244; B60N 2/0248; B60N 2/0252; B60N 2/0276; B60N 2/067; B60N 2/28; B60N 2/2806

See application file for complete search history.

(56) References Cited

U.S. PATENT DOCUMENTS

| | | | | |
|---|---|---|---|---|
| 2008/0252412 | A1* | 10/2008 | Larsson | B60R 25/25 340/5.2 |
| 2012/0022716 | A1* | 1/2012 | Kitahama | G01C 21/34 701/1 |
| 2012/0101711 | A1* | 4/2012 | Furmston | G01S 7/415 701/300 |
| 2014/0058613 | A1* | 2/2014 | Leinfelder | B62D 15/028 701/28 |

FOREIGN PATENT DOCUMENTS

| | | |
|---|---|---|
| JP | 2013-052462 A | 3/2013 |
| JP | 2013-206237 A | 10/2013 |
| JP | 2014-002590 A | 1/2014 |
| KR | 101056681 B1 | 8/2011 |

OTHER PUBLICATIONS

Japanese Office Action received in corresponding Japanese Application No. 2017-548578 dated Sep. 25, 2018.

* cited by examiner

FLOWCHART OF REMOTE CONTROL SERVER

FIG.14

TABLE: ROAD MAP INFORMATION 1401

| ROAD | CONNECTION POINT 1 | CONNECTION POINT 2 |
|---|---|---|
| A | P | Q |
| B | P | R |
| C | Q | R |
| D | Q | S |
| E | R | S |

FIG.15

TABLE: AUTONOMOUS TRAVELING DIFFICULTY LEVEL INFORMATION 1501

| ROAD | AUTONOMOUS TRAVELING RELEASE PROBABILITY |
|---|---|
| A | 0.01 |
| B | 0.001 |
| C | 0.002 |
| D | 0.1 |
| E | 0.001 |

FIG.16

TABLE: COMMUNICATION QUALITY INFORMATION 1601

| ROAD | REMOTE CONTROLLED TRAVELING RELEASE PROBABILITY |
|---|---|
| A | 0.002 |
| B | 0.1 |
| C | 0.01 |
| D | 0.01 |
| E | 0.1 |

TABLE: UNABLE-TO-TRAVEL RISK INFORMATION

| ROAD | CONNECTION POINT 1 | CONNECTION POINT 2 | UNABLE-TO-TRAVEL PROBABILITY |
|---|---|---|---|
| A | P | Q | 0.00002 |
| B | P | R | 0.0001 |
| C | Q | R | 0.00004 |
| D | Q | S | 0.001 |
| E | R | S | 0.0001 |

TABLE: TRAVELING PATH LIST

| PATH NUMBER | ROAD 1 | ROAD 2 | ROAD 3 | UNABLE-TO-TRAVEL-ON-ROAD PROBABILITY SUM |
|---|---|---|---|---|
| 1 | A | D | — | 0.00102 |
| 2 | A | C | E | 0.00014 |
| 3 | B | E | — | 0.00020 |
| 4 | B | C | D | 0.00112 |

FIG.19

TABLE: ROAD TYPE INFORMATION

| ROAD TYPE | AUTONOMOUS TRAVELING RELEASE PROBABILITY |
|---|---|
| EXPRESSWAY | 0 |
| NATIONAL ROAD | 0.001 |
| PREFECTURAL ROAD | 0.005 |
| MUNICIPAL ROAD | 0.05 |
| PRIVATE ROAD | 0.01 |

FIG.20

TABLE: ROAD WHITE LINE

| ROAD WHITE LINE COVER RATIO | AUTONOMOUS TRAVELING RELEASE PROBABILITY |
|---|---|
| 100% | 0 |
| 95% OR MORE AND LESS THAN 100% | 0.0001 |
| 75% OR MORE AND LESS THAN 95% | 0.001 |
| 50% OR MORE AND LESS THAN 75% | 0.005 |
| 25% OR MORE AND LESS THAN 50% | 0.01 |
| LESS THAN 25% | 0.05 |

FIG. 21

TABLE: CALCULATION OF AUTONOMOUS TRAVELING DIFFICULTY LEVEL BASED ON ROAD TYPE AND ROAD WHITE LINE INFORMATION

2101

| ROAD | ROAD TYPE | AUTONOMOUS TRAVELING RELEASE PROBABILITY CORRESPONDING TO ROAD TYPE | WHITE LINE COVER RATIO | AUTONOMOUS TRAVELING RELEASE PROBABILITY CORRESPONDING TO WHITE LINE COVER RATIO | AUTONOMOUS TRAVELING RELEASE PROBABILITY SUM |
|---|---|---|---|---|---|
| A | PREFECTURAL ROAD | 0.005 | 65% | 0.005 | 0.01 |
| B | EXPRESSWAY | 0 | 90% | 0.001 | 0.001 |
| C | NATIONAL ROAD | 0.001 | 70% | 0.001 | 0.002 |
| D | MUNICIPAL ROAD | 0.05 | 10% | 0.05 | 0.1 |
| E | NATIONAL ROAD | 0.001 | 100% | 0 | 0.001 |

TABLE: DELAY TIME INFORMATION

| DELAY TIME 99% VALUE | REMOTE CONTROLLED TRAVELING RELEASE PROBABILITY |
|---|---|
| LESS THAN 50 [ms] | 0 |
| 75 [ms] OR MORE AND LESS THAN 100 [ms] | 0.001 |
| 400 [ms] OR MORE AND LESS THAN 150 [ms] | 0.05 |
| 120 [ms] OR MORE AND LESS THAN 200 [ms] | 0.005 |
| 110 [ms] OR MORE AND LESS THAN 500 [ms] | 0.005 |
| 300 [ms] OR MORE | 0.05 |

TABLE: THROUGHPUT INFORMATION

| THROUGHPUT 99% VALUE | REMOTE CONTROLLED TRAVELING RELEASE PROBABILITY |
|---|---|
| 10 [Mbps] OR MORE | 0.0001 |
| 5 [Mbps] OR MORE AND LESS THAN 10 [Mbps] | 0.001 |
| 1 [Mbps] OR MORE AND LESS THAN 5 [Mbps] | 0.005 |
| 500 [Kbps] OR MORE AND LESS THAN 1 [Mbps] | 0.01 |
| LESS THAN 500 [Kbps] | 0.05 |

FIG. 24

TABLE: CALCULATION OF REMOTE CONTROLLED TRAVELING RELEASE PROBABILITY BASED ON DELAY TIME AND THROUGHPUT
~2401

| ROAD | DELAY TIME 99% VALUE | REMOTE CONTROLLED TRAVELING RELEASE PROBABILITY CORRESPONDING TO DELAY TIME 99% VALUE | THROUGHPUT 99% VALUE | REMOTE CONTROLLED TRAVELING RELEASE PROBABILITY CORRESPONDING TO THROUGHPUT 99% VALUE | REMOTE CONTROLLED TRAVELING RELEASE PROBABILITY SUM |
|---|---|---|---|---|---|
| A | 75 [ms] | 0.001 | 8 [Mbps] | 0.001 | 0.002 |
| B | 400 [ms] | 0.05 | 300 [Kbps] | 0.05 | 0.1 |
| C | 120 [ms] | 0.005 | 3 [Mbps] | 0.005 | 0.01 |
| D | 110 [ms] | 0.005 | 2 [Mbps] | 0.005 | 0.01 |
| E | 300 [ms] | 0.05 | 300 [Kbps] | 0.05 | 0.1 |

FIG.28

TABLE: NECESSARY ROAD TIME INFORMATION 2801

| ROAD | NECESSARY ROAD TIME |
|---|---|
| A | 10 [min] |
| B | 15 [min] |
| C | 2 [min] |
| D | 11 [min] |
| E | 31 [min] |

FIG. 30

TABLE: REMOTE CONTROLLED TRAVELING EXECUTION RISK INFORMATION 3001

| ROAD | CONNECTION POINT 1 | CONNECTION POINT 2 | UNABLE-TO-TRAVEL PROBABILITY |
|---|---|---|---|
| A | P | Q | 0.00998 |
| B | P | R | 0.0009 |
| C | Q | R | 0.00198 |
| D | Q | S | 0.099 |
| E | R | S | 0.0009 |

FIG. 31

TABLE: REMOTE CONTROLLED TRAVELING EXECUTION RISK INFORMATION 3101

| ROAD | CONNECTION POINT 1 | CONNECTION POINT 2 | COST |
|---|---|---|---|
| A | P | Q | 0.01018 |
| B | P | R | 0.0019 |
| C | Q | R | 0.00218 |
| D | Q | S | 0.199 |
| E | R | S | 0.0019 |

TABLE: WEIGHTING TABLE

| OPERATION MANAGEMENT INFORMATION | REMOTE CONTROLLED TRAVELING WEIGHTING | UNABLE-TO-TRAVEL STATE WEIGHTING |
|---|---|---|
| NUMBER OF REMOTE CONTROLLED VEHICLES ≦ NUMBER OF VEHICLES UNABLE TO TRAVEL ×5 | 1 | 15 |
| NUMBER OF REMOTE CONTROLLED VEHICLES > NUMBER OF VEHICLES UNABLE TO TRAVEL ×5 AND NUMBER OF REMOTE CONTROLLED VEHICLES < NUMBER OF VEHICLES UNABLE TO TRAVEL ×15 | 1 | 10 |
| NUMBER OF REMOTE CONTROLLED VEHICLES ≧ NUMBER OF VEHICLES UNABLE TO TRAVEL ×15 | 1 | 5 |

3302  3303  3304

3305

MOVING OBJECT MOVEMENT SYSTEM AND MOVEMENT PATH SELECTION METHOD

TECHNICAL FIELD

The present invention relates to a moving object movement system and a movement path selection method.

BACKGROUND ART

In recent years, autonomous traveling of automobiles has been realized with the development of technologies that support autonomous traveling of automobiles such as a stereo camera and a laser scanner. Further, with the development of moving object communication technology such as cellular communication technology, it became possible to remotely control moving objects via wireless communication. As a method of selecting a traveling path of an autonomous vehicle, there is a technique of Patent Document 1. As a method of deciding a traveling path of a robot that moves in accordance with remote control, there is a technique of Patent Document 2.

CITATION LIST

Patent Document

Patent Document 1: JP 2011-65308 A
Patent Document 2: Japanese Patent Application No. 2012-137909

SUMMARY OF THE INVENTION

Problems to be Solved by the Invention

In a case in which an automobile which performs the autonomous traveling is unable to recognize the circumstances correctly, the automobile is unable to decide a direction in which the automobile should travel, or the like and faces a situation where the autonomous traveling is unable to be performed. For example, the automobile which performs the autonomous traveling by recognizing a position of a white line through a camera may not be able to continue the autonomous traveling in places in which the white line is broken or the white line is thin. A technique that enables an autonomous vehicle to select a path with a high probability that the autonomous traveling can be performed and travel is disclosed in Patent Document 1.

In a case in which a radio wave is blocked by an obstacle or the like, and a communication quality deteriorates, an automobile that moves in accordance with remote control via wireless communication may not be able to move. A method of selecting a path with a high probability of remote control and a good communication quality as a movement path of a moving object that moves in accordance with remote control is disclosed in Patent Document 2.

In this document, a moving object and a moving object traveling system in which the moving object moves in accordance with the autonomous traveling in a situation in which the autonomous traveling can be performed, the moving object moves in accordance with the remote control in a case in which the autonomous traveling is unable to be performed, and the moving object is unable to travel in a case in which neither the autonomous traveling nor the remote control can be performed are assumed. In this document, a traveling path selection method of minimizing a probability that traveling is unable to be performed in the moving object traveling system is reviewed. In the method disclosed in Patent Document 1, a path with a high probability of autonomous traveling is selected, but a path with a high probability of autonomous traveling is not necessarily a path capable of minimizing the probability that traveling is unable to be performed. In the method disclosed in Patent Document 2, a path with a high probability of traveling according to the remote control is selected, but a path with a high probability of traveling according to the remote control is not necessarily a path capable of minimizing the probability that traveling is unable to be performed.

The present invention was made to solve the above-mentioned problems, and it is an object of the present invention to provide a method of selecting a path capable of minimizing the probability that traveling is unable to be performed.

Solutions to Problems

In order to solve the above problem and achieve the object, a moving object movement system according to the present invention includes a moving object that moves in accordance with any one method of autonomous movement or remote controlled movement, a control server that is connected to the moving object via wireless communication, and a traveling path deciding unit that calculates an unable-to-move risk indicating a possibility that movement is unable to be performed in accordance with any one method of the autonomous movement or the remote controlled movement on the basis of map information including movement paths of the moving object, autonomous movement difficulty level information indicating a difficulty level of the autonomous movement by the moving object, and communication quality information indicating a communication quality necessary for the moving object to perform the remote controlled movement, and decides a movement path in which the calculated unable-to-move risk is smallest among the movement paths.

Further, the present invention is also understood as a movement path selection method performed in the moving object movement system.

Effects of the Invention

According to the present invention, is possible to select a path capable of minimizing the probability that traveling is unable to be performed.

BRIEF DESCRIPTION OF THE DRAWINGS

FIG. 14 is a table illustrating road map information.

FIG. 15 is a table illustrating autonomous traveling difficulty level information.

FIG. 16 is a table illustrating communication quality information.

FIG. 17 is a table illustrating unable-to-travel risk information.

FIG. 18 is a diagram illustrating a traveling path list from a start point P to an end point S in FIG. 13.

FIG. 19 is a table in which a road type is associated with an autonomous traveling release probability.

FIG. 20 is a table in which a road white line cover ratio is associated with an autonomous traveling release probability.

FIG. 21 is a table in which a sum of an autonomous traveling release probability of each road is obtained on the basis of road type information of FIG. 19 and road white line cover ratio information of FIG. 20.

FIG. 22 is a table in which a delay time is associated with a remote controlled traveling release probability.

FIG. 23 is a table in which a throughput is associated with a remote controlled traveling release probability.

FIG. 24 is a table in which a delay time and a throughput are associated with a remote controlled traveling release probability.

FIG. 28 is a table in which a road is associated with a necessary road time.

FIG. 30 is a diagram illustrating an example of a remote controlled traveling execution risk.

FIG. 31 is a diagram illustrating an example of a cost of each road.

FIG. 33 is a diagram illustrating an example of a weighting table.

MODE FOR CARRYING OUT THE INVENTION

Exemplary embodiments of the present invention will be described with reference to the appended drawings. In the embodiment of the present invention, an automobile will be described as an example of a moving object, but the moving object is not particularly limited as long as moving according to both the autonomous traveling and the remote control can be performed. Examples of the moving object include industrial robots, humanoid robots, drones, aircrafts, helicopters, ships, submarines, and the like. Further, the embodiments of the present invention will be described with an example in which the moving object and a remote control server used for remotely controlling the moving object communicate with each other via a wide area network, but they may communicate with each other via a local network.

First Embodiment

Figure 1:
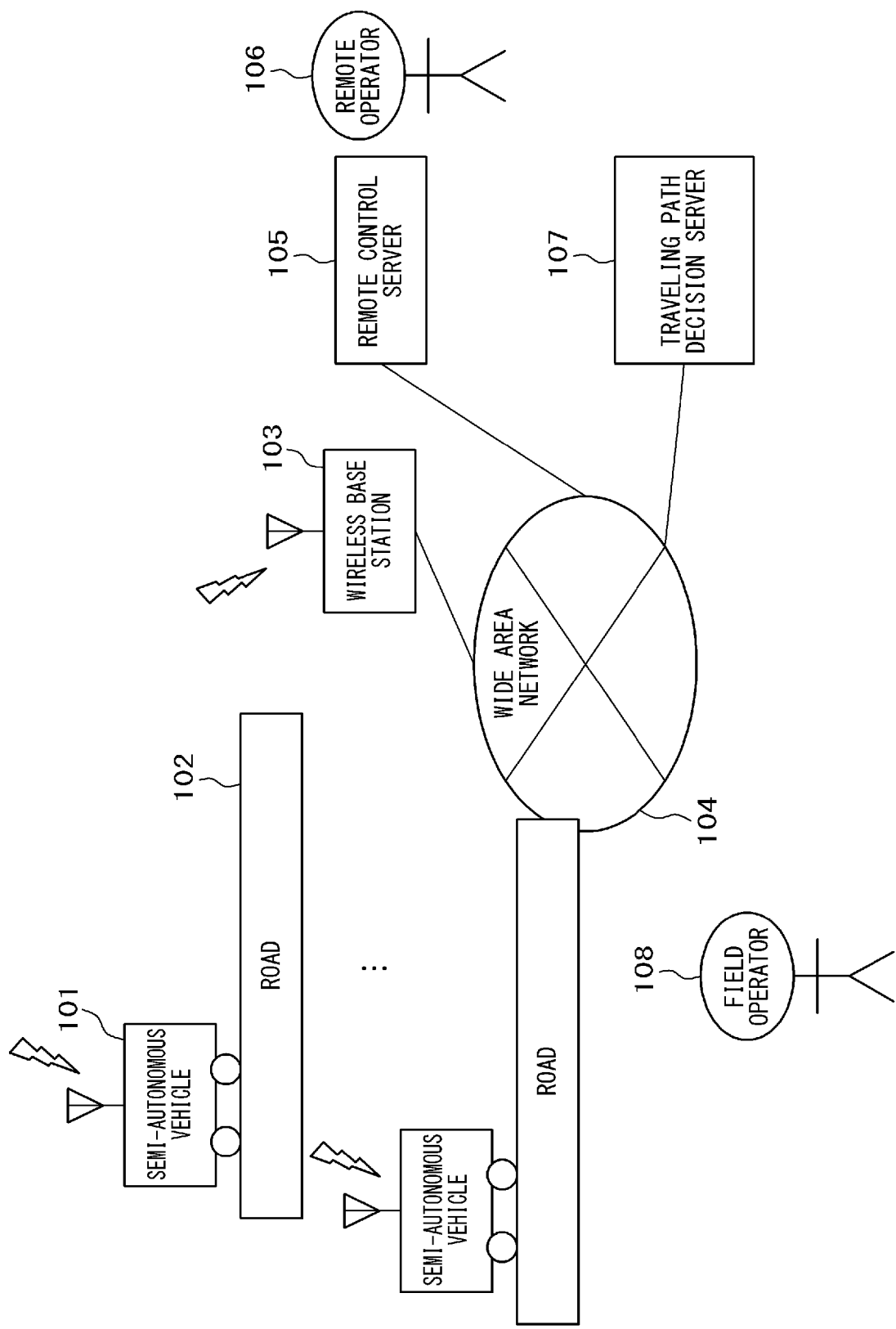
FIG. 1 is a system configuration diagram of a semi-autonomous traveling system.

FIG. 1 illustrates a system configuration diagram of a semi-autonomous traveling system to which a moving object movement system and a movement path selection method according to the present invention are applied. The semi-autonomous traveling system includes a semi-autonomous vehicle 101, a road 102, a wireless base station 103, a wide area network 104, a remote control server 105, a remote operator 106, a path deciding server 107, and a field operator 108. FIG. 1 illustrates only one example, and the number of each element in each drawing may be two or more. For example, there may be a plurality of semi-autonomous vehicles 101 in a certain semi-autonomous traveling system. For example, there may be a plurality of remote control servers 105 in the semi-autonomous traveling system.

The semi-autonomous vehicle 101 is an automobile traveling on the road 102. The semi-autonomous vehicle 101 carries out traveling in accordance with the autonomous traveling or the remote control. The semi-autonomous vehicle 101 is unable to travel in a case in which none of the autonomous traveling and the remote control can be performed. The semi-autonomous vehicle 101 communicates with the remote control server 105 via the wireless base station 103 and the wide area network 104. The wireless base station 103 connects the semi-autonomous vehicle 101 with the wide area network 104. The wide area network 104 connects the wireless base station 103 with the remote control server 105.

On the basis of an input from the operator 106, the remote control server 105 generates a control signal for controlling the semi-autonomous vehicle 101 and transmits the control signal to the semi-autonomous vehicle 101 via the wide area network 104 and the wireless base station 103. The traveling path deciding server 107 decides a traveling path of the semi-autonomous vehicle 101 and notifies the semi-autonomous vehicle 101 of the traveling path. In a case in which the semi-autonomous vehicle 101 enters an unable-to-travel state, the field operator 108 moves to the semi-autonomous vehicle 101 and steers the semi-autonomous vehicle 101. In a case in which the autonomous traveling can be performed by the steering of the field operator 108, the semi-autonomous vehicle 101 may transition to an autonomous traveling state. Further, in a case in which remote controlled traveling can be performed by the steering of the field operator 108, the semi-autonomous vehicle 101 may enter a remote controlled traveling state.

Figure 2:
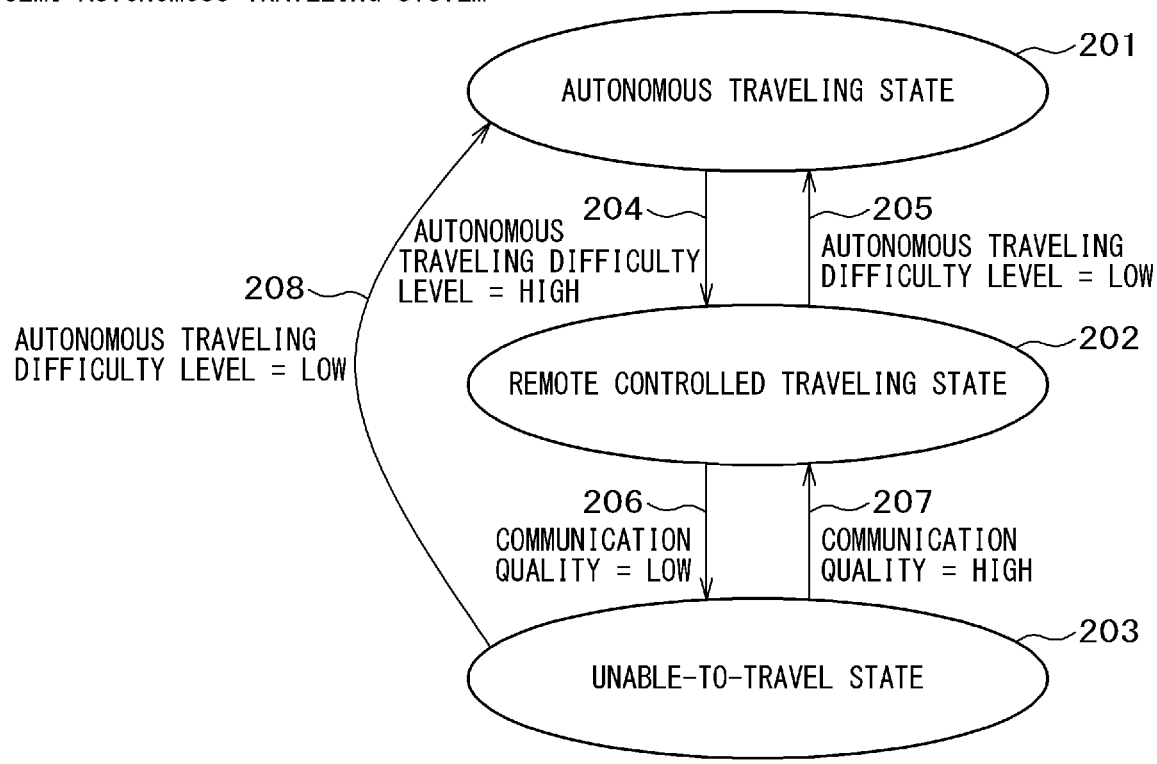
FIG. 2 is a diagram illustrating a state transition of a semi-autonomous vehicle.

FIG. 2 is a diagram illustrating a state transition of the semi-autonomous vehicle 101. An autonomous traveling state 201 is a state in which the semi-autonomous vehicle 101 is performing the autonomous traveling. A remote controlled traveling state 202 is a state in which the semi-autonomous vehicle 101 is traveling in accordance with the remote control. An unable-to-travel state 203 is a state in which the semi-autonomous vehicle 101 is unable to travel by any method of the autonomous traveling and the remote controlled traveling. The semi-autonomous vehicle 101 stays in the autonomous traveling state 201 in situations in which the autonomous traveling can be performed.

Transition of arrow 204 occurs in a case in which a road on which the semi-autonomous vehicle 101 is traveling is high in an autonomous traveling difficulty level, and determination for the autonomous traveling is unable to be performed. When the semi-autonomous vehicle 101 is in the autonomous traveling state 201, in a case in which the autonomous traveling is unable to be performed, transition from the autonomous traveling state 201 to the remote controlled traveling state 202 is performed. Arrow 205 indicates a state transition from the remote controlled traveling state 202 to the autonomous traveling state 201. The transition of arrow 205 occurs in a case in which, when the semi-autonomous vehicle 101 is in the remote controlled traveling state 202, the autonomous traveling difficulty level of the road on which the semi-autonomous vehicle 101 is traveling decreases, and the semi-autonomous vehicle 101 can travel even in the autonomous traveling. Arrow 206 indicates a state transition from the remote controlled traveling state 202 to the unable-to-travel state 203.

The transition of arrow 206 occurs in a case in which, when the semi-autonomous vehicle 101 is in the remote controlled traveling state 202, the communication quality of the road decreases, and the semi-autonomous vehicle 101 is unable to travel in accordance with the remote control. Arrow 207 indicates a transition from the unable-to-travel state 203 to the remote controlled traveling state 202. The transition of arrow 207 occurs in a case in which, when the semi-autonomous vehicle 101 is in the unable-to-travel state 203, the semi-autonomous vehicle 101 moves up to a road in which the communication quality is good, and the remote control can be performed in accordance with the steering of the field operator 108. An arrow 208 indicates a transition from the unable-to-travel state 203 to the autonomous traveling state 201. The transition of arrow 208 occurs in a case in which, when the semi-autonomous vehicle 101 is in the unable-to-travel state 203, the semi-autonomous vehicle 101 moves up to a road in which the autonomous traveling difficulty level is low in accordance with the steering of the field operator 108, and the autonomous traveling becomes possible.

Figure 3:
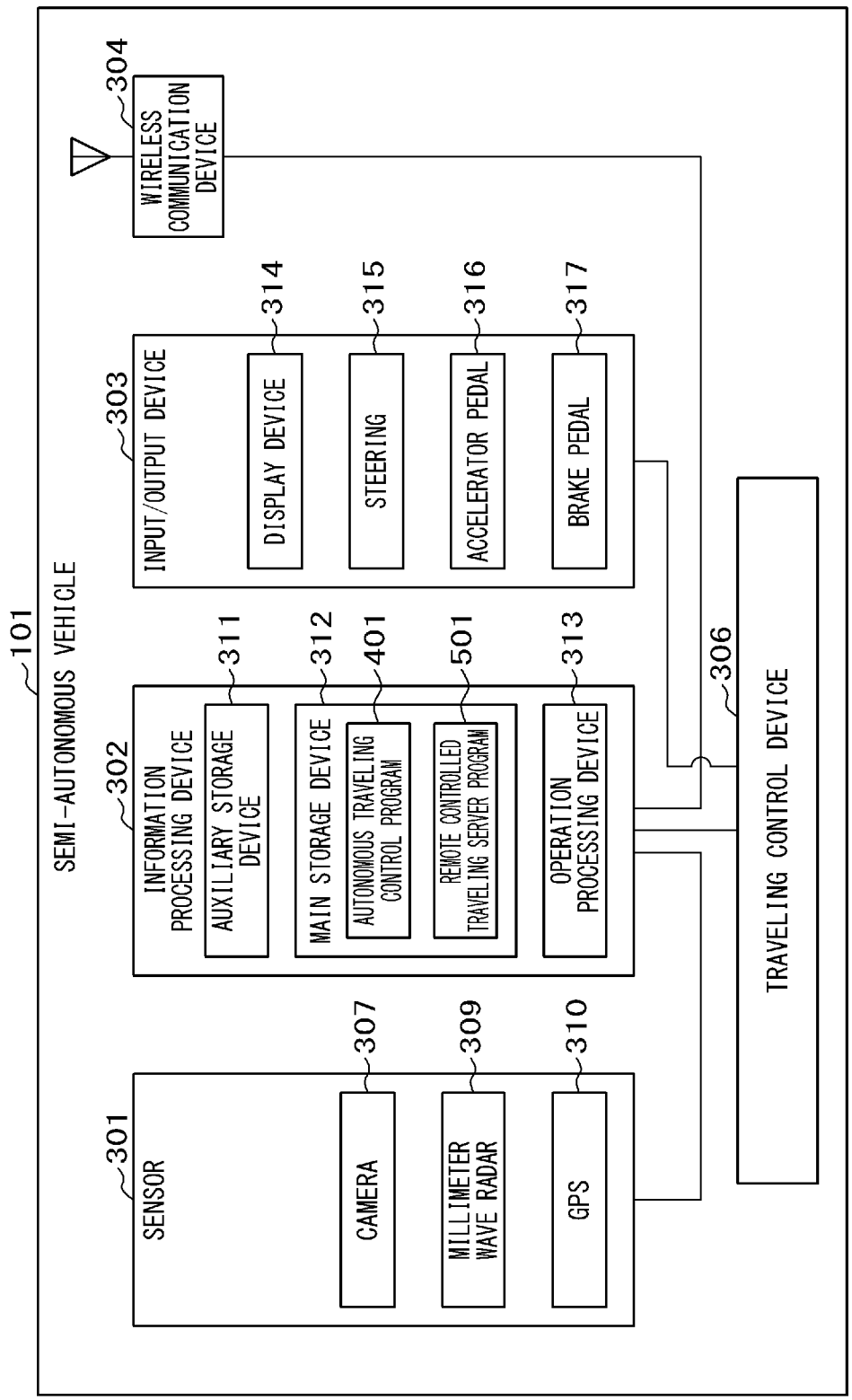
FIG. 3 is a hardware configuration diagram of a semi-autonomous vehicle.

FIG. 3 illustrates a hardware configuration diagram of the semi-autonomous vehicle 101. The semi-autonomous vehicle 101 includes a sensor 301, an information processing device 302, an input/output device 303, a wireless communication device 304, a traveling control device 306, and an actuator (not illustrated). The sensor 301 is used to acquire peripheral information of the semi-autonomous vehicle 101. The sensor 301 inputs the acquired sensor information to the information processing device 302. The input/output device 303 is used for steering by a driver riding in the semi-autonomous vehicle 101. The field operator 108 operates the semi-autonomous vehicle 101 using the input/output device 303. On the basis of a control signal from the input/output device 303, the traveling control device 306 executes operations related to traveling such as acceleration, deceleration, and turning.

The information processing device 302 executes an autonomous traveling control program 401 and a remote controlled traveling server program 501. The autonomous traveling control program 401 and the remote controlled traveling server program 501 will be described later in detail. The information processing device 302 may execute programs other than the autonomous traveling control program 401 and the remote controlled traveling server program 501. The autonomous traveling control program 401 is a program that enables the semi-autonomous vehicle 101 to perform the autonomous traveling. The remote controlled traveling server program 501 is a program that enables the semi-autonomous vehicle 101 to perform the remote controlled traveling. The information processing device 302 executes the autonomous traveling control program 401 and outputs a traveling command to the traveling control device 306 on the basis of information input from the sensor 301. The information processing device 302 executes the remote controlled traveling server program 501, receives a control signal transmitted from the remote control server 105 via the wireless communication device 304, and inputs the control signal to the traveling control device 306. The wireless communication device 304 establishes a connection with the wide area network 104 via the wireless base station 102.

The sensor 301 includes a camera 307, a millimeter wave radar 309, and a global positioning system (GPS) 310. The camera 307 is used to acquire image information around the semi-autonomous vehicle 101. The millimeter wave radar 309 is used to measure a distance between the semi-autonomous vehicle 101 and an object around the semi-autonomous vehicle 101. The GPS 310 is used to acquire coordinates of a longitude and a latitude of a place in which the autonomous vehicle 101 is located. The information processing device 302 includes an auxiliary storage device 311, a main storage device 312, and an operation processing device 313. The auxiliary storage device 311 is used to constantly store information, and includes, for example, a hard disk or the like. The main storage device 312 is used to temporarily store programs executed by the operation processing device 313. The operation processing device 313 is a device that performs various operations related to data processing. The autonomous traveling control program 401 and the remote controlled traveling server program 501 are stored in the auxiliary storage device 311. The autonomous traveling control program 401 and the remote controlled traveling server program 501 are read from the auxiliary storage device 311 to the main storage device 312 and executed by the operation processing device 311.

The input/output device 303 includes a display device 314, a steering 315, an accelerator pedal 316, and a brake pedal 317. The display device 314 is a device that displays a traveling situation of the semi-autonomous vehicle 101. The display device 314 displays, for example, a traveling speed, a traveling position, a traveling distance, and the like. The steering 315 is used to control a moving method of the semi-autonomous vehicle 101. The accelerator pedal 316 is used for accelerating the autonomous vehicle 101. The brake pedal 317 is used to decelerate the autonomous vehicle 101.

An example of a connection relation of hardware constituting the semi-autonomous vehicle will be described below. The sensor 301 and the information processing device 302 are connected by a signal line for performing transmission and reception of information with each other. The traveling control device 306 and the signal input/output device 303 are connected by a signal line for performing transmission and reception of information with each other. The wireless communication device 304 and the information processing device 302 are connected by a signal line for performing transmission and reception of information with each other. The information processing device 302 and the traveling control device 306 are connected by a signal line for performing transmission and reception of information with each other. The above example is an example of connection, and, for example, there is a method of connecting all pieces of hardware via a single signal bus and performing transmission and reception of information. FIG. 1 illustrates an example of the hardware configuration of the semi-autonomous vehicle 101, and a configuration including no one or more pieces of hardware thereof may be provided.

Figure 4:
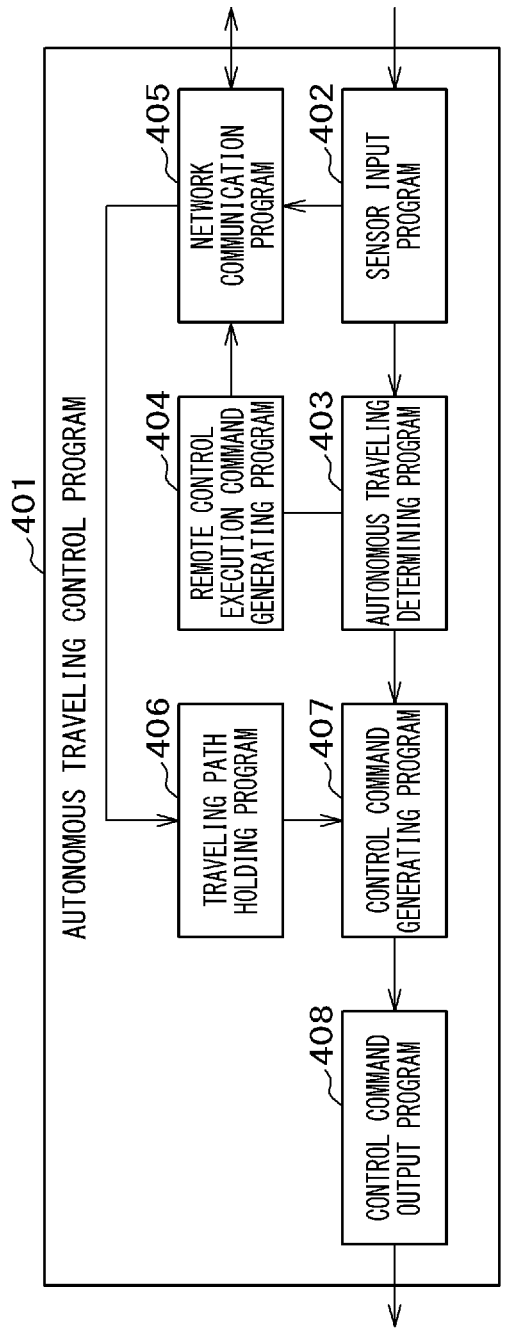
FIG. 4 is a functional block diagram of an autonomous traveling control program.

FIG. 4 is a functional block diagram of the autonomous traveling control program 401. The autonomous traveling control program 401 is executed in the information processing device 302 in the semi-autonomous vehicle 101. The autonomous traveling control program 401 performs two processes roughly. One is a process of causing the autonomous vehicle 101 to perform the autonomous traveling on the basis of sensor information. The other is a process of transmitting a command to cause the remote control server 105 to perform the remote control in a case in which the autonomous vehicle 101 is unable to perform the autonomous traveling.

The autonomous traveling control program 401 includes a sensor input program 402, an autonomous traveling determining program 403, a remote control execution command generating program 404, a network communication program 405, a traveling path holding program 406, a control command generating program 407, and a control command output program 408. The sensor input program 402 receives sensor data from the sensor 301, inputs the sensor data to the autonomous traveling determining program 403, and transmits the sensor data to the remote control server 105 via the network communication program 405 and the wireless communication device 304. The autonomous traveling determining program 403 determines whether or not the autonomous traveling can be continued on the basis of the sensor data input from the sensor input program 402. In a case in which the autonomous traveling is determined to be unable to be performed, the autonomous traveling determining program 403 give a notification to the remote driving execution command generating program 404. Upon receiving the notification from the autonomous traveling determining program 403, the remote control execution command generating program 404 generates a remote control execution command and transmits the remote control execution command to the remote control server 105 via the network communication program 405 and the wireless communication device 304.

In a case in which it is determined that the autonomous traveling can be continued, the autonomous traveling determining program 403 inputs the sensor data input from the sensor input program 402 to the control command generating program 407. When the sensor data is input from the autonomous traveling determining program 403, the control command generating program 407 generates a control command on the basis of the sensor data and traveling path information held in the traveling path holding program 406, and outputs the control command to the control command output program 408. The control command output program 408 outputs the control command input from the control command generating program 407 to the traveling control device 306. The traveling path holding program 406 receives the traveling path information decided by the traveling path deciding server 107 via the wireless communication device 304 and the network communication program 405 and holds the traveling path information. The network communication program 405 transmits the sensor data input from the sensor input program 402 to the remote control server 105 via the wireless communication device 304. The network communication program 405 receives the traveling path information transmitted by the traveling path deciding server 107 via the wireless communication device 304 and outputs the traveling path information to the traveling path holding program 406. The network communication program 405 transmits the remote control execution command input from the remote control execution command generating program 404 to the remote control server 105 via the wireless communication device 304.

Figure 5:
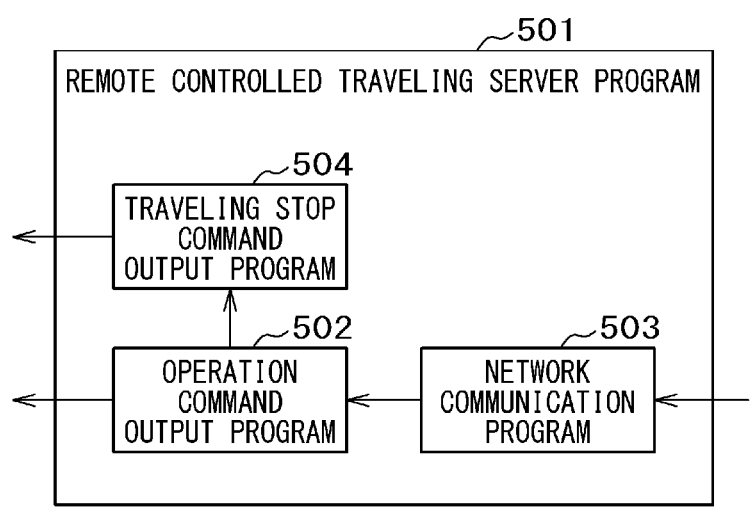
FIG. 5 is a functional block diagram of a remote controlled traveling server program.

FIG. 5 is a functional block diagram of the remote controlled traveling server program 501. The remote controlled traveling server program 501 is executed in the information processing device 302 in the semi-autonomous vehicle 101. The remote controlled traveling server program 501 is a program that enables the semi-autonomous vehicle 101 to travel on the basis of a command transmitted from the remote control server 105. The remote controlled traveling server program 501 includes an operation command output program 502, a network communication program 503, and a traveling stop command output program 504. In a case in which the control command output program 502 receives the control command transmitted from the remote control server 105 via the wireless communication device 304 and the network communication program 503, the control command output program 502 outputs the control command to the traveling control device 306. In a case in which the control command is not received for a certain period of time while the semi-autonomous vehicle 101 is performing the remote controlled traveling, the control command output program 502 generates a traveling stop command, and outputs the traveling stop command to the traveling stop command output program 504. In a case in which the traveling stop command is received from the control command output program 502, the traveling stop command output program 504 outputs the traveling stop command to the traveling control device 306.

Figure 6:
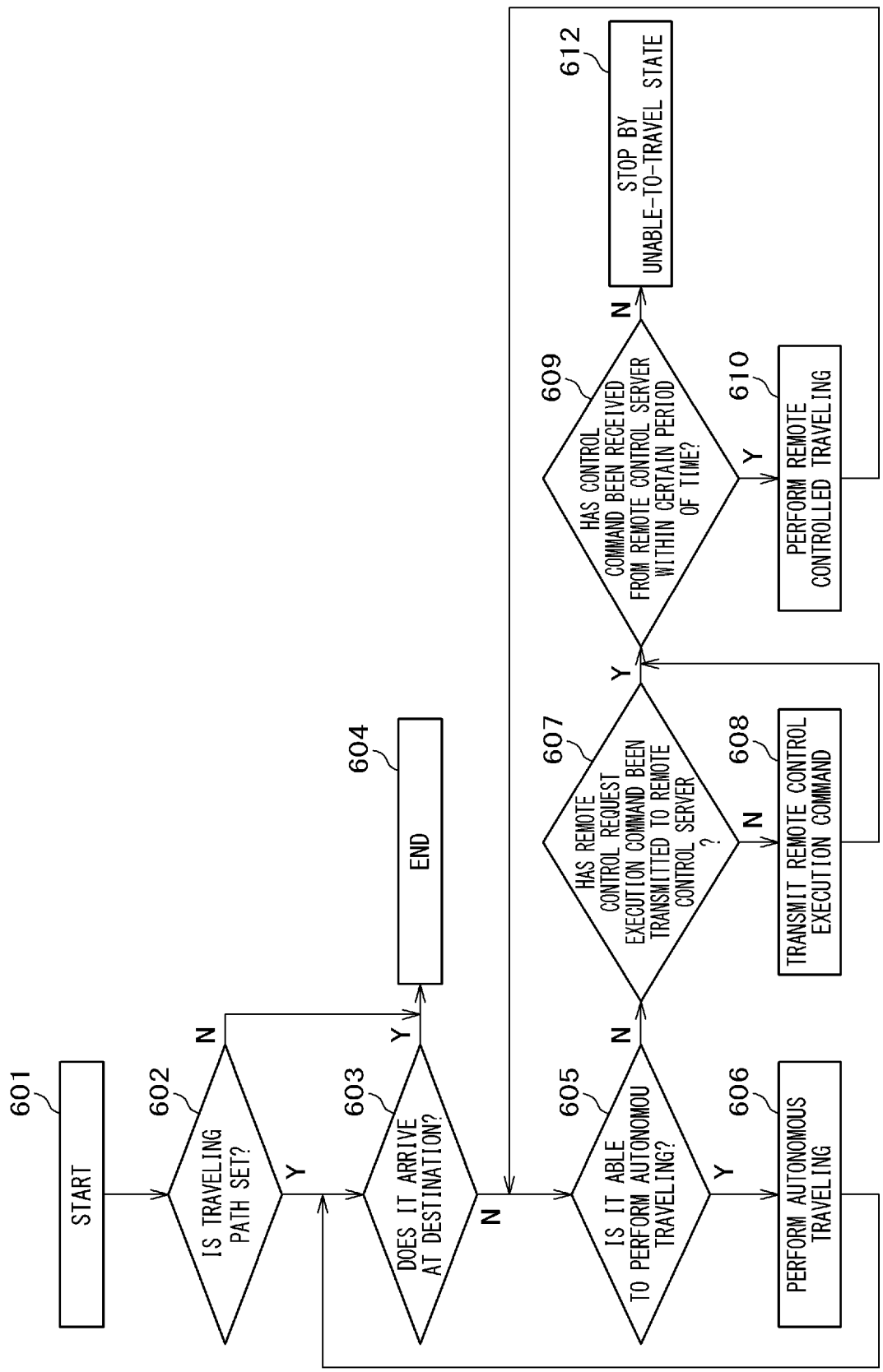
FIG. 6 is a flowchart of an operation of a semi-autonomous vehicle.

FIG. 6 is a flowchart of an operation of the semi-autonomous vehicle 101. First, the autonomous traveling control program 401 checks whether or not the traveling path is set (602), and in a case in which the traveling path is not set (N in 602), the autonomous traveling control program 401 ends the process (604). In a case in which the traveling path is set (Y in 602), the autonomous traveling control program 401 checks whether or not it arrives at the destination (603). In a case in which it arrives at the destination (N in 603), the autonomous traveling control program 401 ends the process (604), and in a case in which it does not arrive at the destination (N in 603), the autonomous traveling control program 401 checks whether or not the autonomous traveling can be performed (605). In a case in which the autonomous traveling can be performed (Y in 605), the autonomous traveling control program 401 executes the autonomous traveling (606).

In a case in which the autonomous traveling is unable to be performed (N in 605), the autonomous traveling control program 401 checks whether or not the remote control signal is transmitted to the remote control server 105 (607). In a case in which the remote control execution command is not transmitted (N in 607), the autonomous traveling control program 401 transmits the remote control execution command (608) and proceeds to process 609. In a case in which the control command is received within a certain period of time after the remote control request execution command is transmitted in process 609 or in a case in which the control command is received within a predetermined period of time after a previous control command is received (Y in 610), the remote controlled traveling server program 501 performs the remote controlled traveling on the basis of the control command (610). In a case in which the control command is not received within a certain period of time after the remote control execution command is transmitted or in a case in which the control command is not received within a predetermined time after the previous control command is received (N in 610), the remote controlled traveling server program 501 enters the unable-to-travel state and stops.

Figure 7:
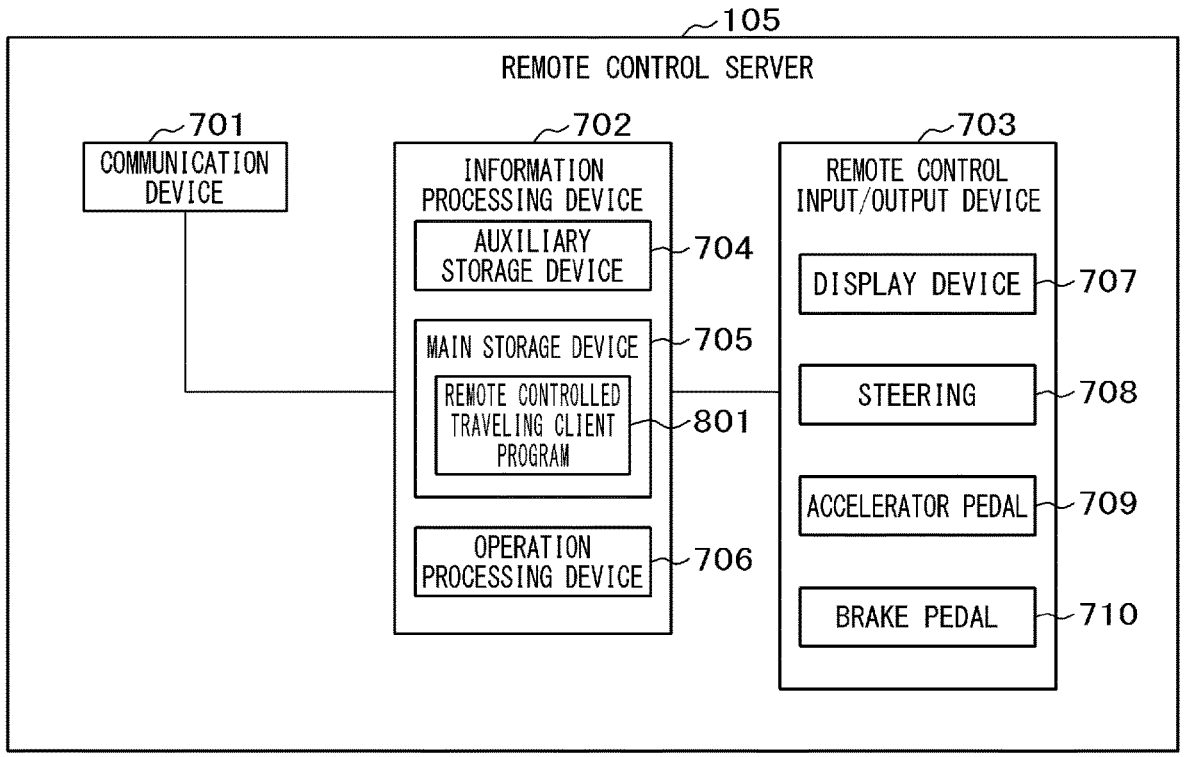
FIG. 7 is a hardware configuration diagram of a remote control server.

FIG. 7 is a diagram illustrating a hardware configuration of the remote control server 105. The remote control server 105 includes a communication device 701, an information processing device 702, and a remote control input/output device 703. The remote control input/output device 703 serves as an interface used for the remote operator 106 to remotely control the semi-autonomous vehicle 101. The remote control input/output device 703 displays the sensor information transmitted from the semi-autonomous vehicle 101. The remote control input/output device 703 outputs an operation input by the remote operator 106 to the information processing device 702. The information processing device 702 executes a remote controlled traveling client program 801. The remote control client program 801 will be described later in detail. The communication device 701 establishes a connection with to the wide area network 104. The information processing device 702 includes an auxiliary storage device 704, a main storage device 705, and an operation processing device 706.

The information processing device 702 includes an auxiliary storage device 704, a main storage device 705, and an operation processing device 706. The auxiliary storage device 704 is used to constantly store information, and includes, for example, a hard disk or the like. The main storage device 705 is used to temporarily store programs executed by the operation processing device 706. The operation processing device 706 is a device that performs various operations related to data processing. The remote controlled traveling client program 801 is stored in the auxiliary storage device 704. The remote control client program 801 is read from the auxiliary storage device 704 to the main storage device 705 and executed by the operation processing device 706.

The remote control input/output device 703 includes a display device 707, a steering 708, a steering accelerator pedal 709, and a brake pedal 710. The display device 707 displays the sensor information of the semi-autonomous vehicle 101 and the like. Examples of information displayed by the display device 707 include an image or a video captured by the camera 307 of the semi-autonomous vehicle 101, coordinates information acquired by the GPS 310, and the like. Other information may be displayed as the information displayed by the display device 707. The steering 708 generates a control command related to a steering operation in accordance with the steering operation performed by the remote operator 106. The steering accelerator pedal 709 generates a control command related to an accelerator operation in accordance with the accelerator operation performed by the remote operator 106. The brake pedal 710 generates a control command related to a brake operation in accordance with the brake operation performed by the remote operator 106.

The communication device 701 and the information processing device 702 are connected by a signal line for performing transmission and reception with each other. The information processing device 702 and the remote control input/output device 703 are connected by a signal line for performing transmission and reception of information with each other. The above example is an example of connection, and, for example, there is a method of connecting all pieces of hardware via a single signal bus and performing transmission and reception of information. FIG. 7 illustrates an example of the hardware configuration of the remote control server 105, and a configuration including no one or more pieces of hardware thereof may be provided.

Figure 8:
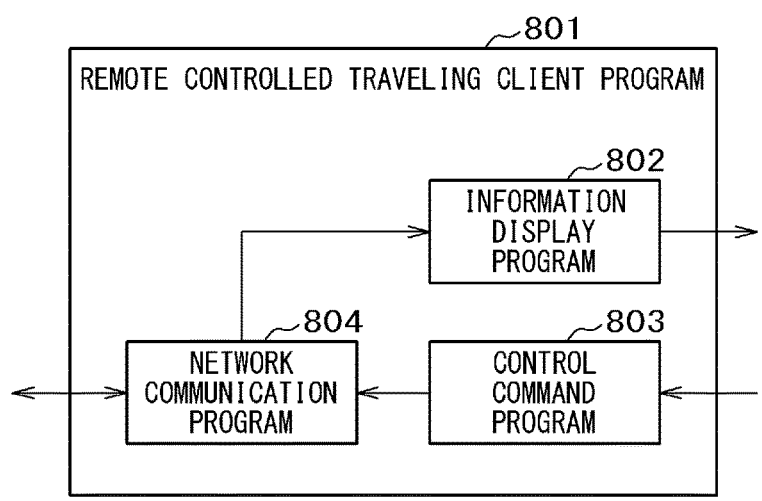
FIG. 8 is a functional block diagram of a remote controlled traveling client program.
Figure 9:
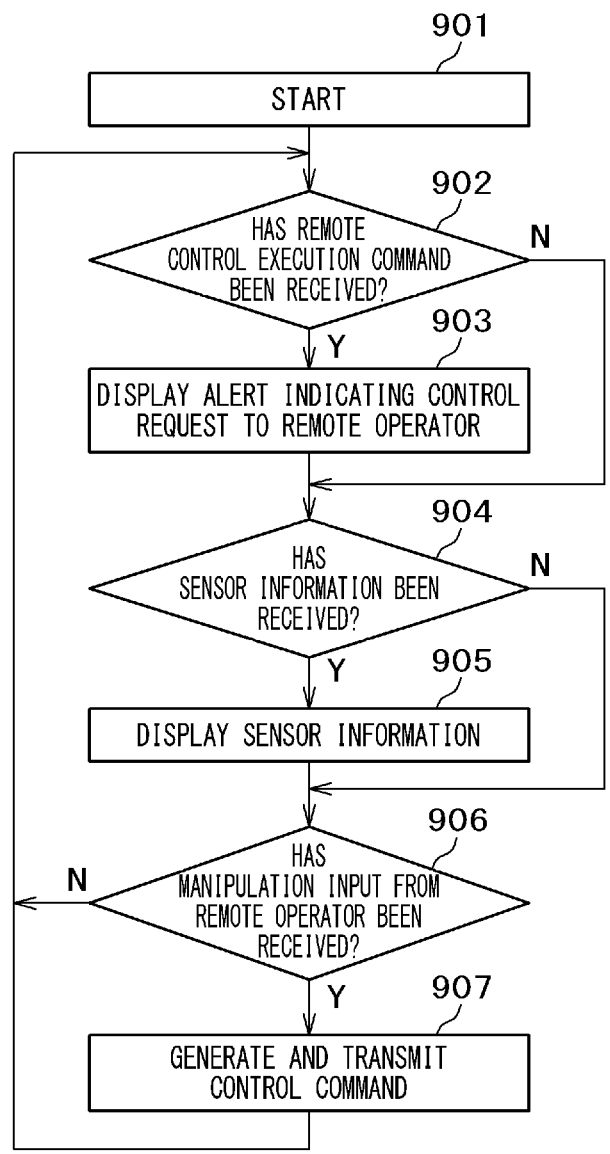
FIG. 9 is a flowchart of an operation of a remote control server.

FIG. 8 is a functional block diagram of the remote controlled traveling client program 801. The remote controlled traveling client program 801 is executed in the information processing device 702. The remote controlled traveling client program 801 includes an information display program 802, a control command input program 803, and a network communication program 804. The network communication program 804 communicates with the semi-autonomous vehicle 101 via the communication device 701. The information display program 802 displays information transmitted from the semi-autonomous vehicle 101 via the communication device 701, the sensor information received via the network communication program 804, and the like. The control command input program 803 outputs a control command based on the operation input output from the remote control input/output device 703 to the communication device 701 via the network communication program 804. FIG. 9 is a flowchart of the operation of the remote control server 105. If the remote control server 105 starts its operation (901), the remote controlled traveling client program 801 checks whether or not or not the remote control execution command from the semi-autonomous vehicle 101 is received (902). In a case in which the remote control execution command is received in step 902 (Y in 902), the remote controlled traveling client program 801 displays an alert indicating remote control for the remote operator (903), and proceeds to step 904. In a case in which the remote control execution command is not received (N in 902), the remote controlled traveling client program 801 proceeds to step 904.

In step 904, the remote controlled traveling client program 801 checks whether or not or not the sensor information is received, and in a case in which the sensor information is received (Y in 904), the remote controlled traveling client program 801 displays the sensor information (905) and proceeds to step 906. In a case in which the sensor information is not received in step 904 (N in 904), the remote controlled traveling client program 801 proceeds to step 906. If an operation input from the remote operator is received in step 906 (Y in 906), the remote controlled traveling client program 801 generates a control command and transmits the control command to the semi-autonomous vehicle 101 (907) and returns to step 902. In a case in which there is no operation input from the remote operator in step 906 (N in 906), the remote controlled traveling client program 801 returns to step 902.

Figure 10:
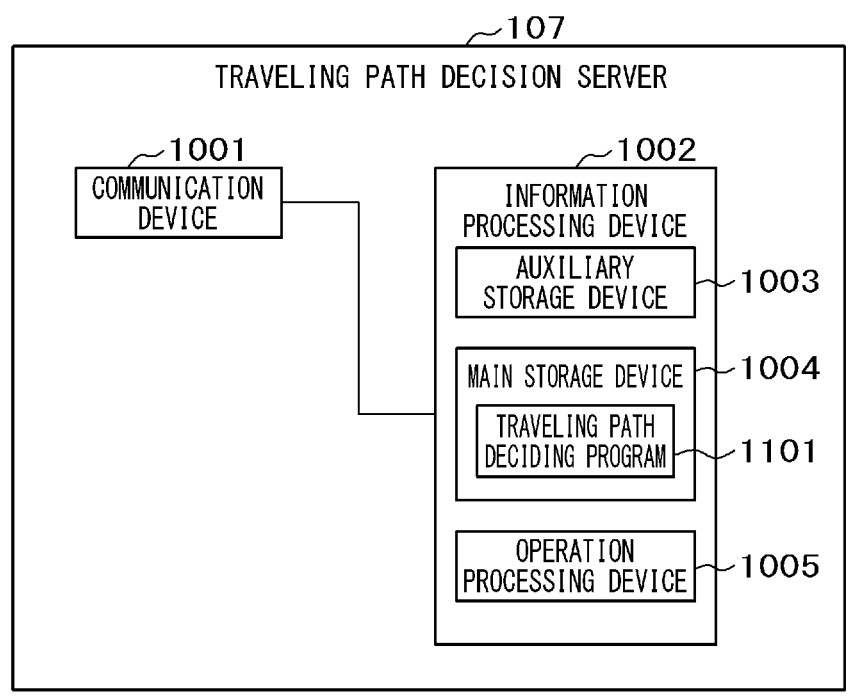
FIG. 10 is a hardware configuration diagram of a traveling path deciding server.

FIG. 10 is a hardware configuration diagram of the traveling path deciding server 107. The traveling path deciding server 107 includes a communication device 1001 and an information processing device 1002.

The communication device 1001 establishes a connection with the wide area network 104 and performs communication. The information processing device 1002 executes a traveling path deciding program 1101. The information processing device 1002 includes an auxiliary storage device 1003, a main storage device 1004, and an operation processing device 1005. The auxiliary storage device 1003 is used for constantly storing information, and includes, for example, a hard disk or the like. The main storage device 1004 is used to temporarily store programs executed by the operation processing device 1005. The operation processing device 1005 is a device that performs various operations related to data processing. The path deciding program 1101 is stored in the auxiliary storage device 1003. The path deciding program 1101 is read from the auxiliary storage device 1003 to the main storage device 1004 and executed by the operation processing device 1005. The communication device 1001 and the information processing device 1002 are connected by a signal line for performing transmission and reception of information with each other. FIG. 10 is an example of the hardware configuration of the traveling path deciding server 107, and a configuration including no one or more pieces of hardware thereof may be provided.

Figure 11:
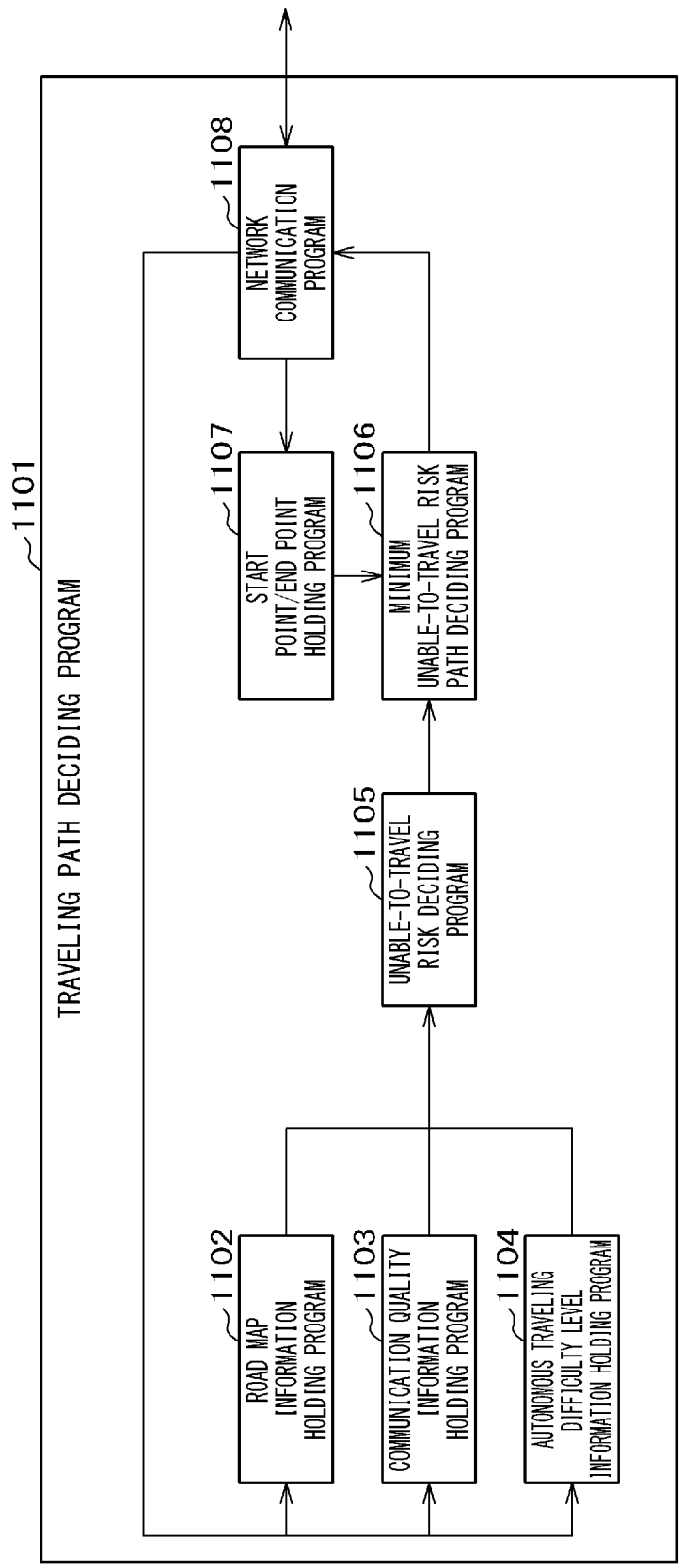
FIG. 11 is a functional block diagram of a traveling path deciding program.

FIG. 11 is a functional block diagram of the traveling path deciding program 1101. The traveling path deciding program 1101 is a program for deciding a path along which the semi-autonomous vehicle 101 travels. The traveling path deciding program 1101 includes a road map information holding program 1102, a communication quality information holding program 1103, an autonomous traveling difficulty level information holding program 1104, an unable-to-travel risk deciding program 1105, a minimum unable-to-travel risk path deciding program 1106, a start point/end point holding program 1107, and a network communication program 1108.

The road map information holding program 1102 stores road map information. The road map information includes one or more paths along which the semi-autonomous vehicle 101 travels and refers to information related to roads which an automobile or the like travel. Examples of the road map information include shapes and lengths of roads, a connection relation between roads, and the like, but other information related to roads may be included. The communication quality holding program 1103 stores communication quality information associated with roads. The communication quality information refers to information indicating a communication quality necessary for the semi-autonomous vehicle 101 to perform the remote controlled traveling and includes direct information related to the communication quality between the semi-autonomous vehicle 101 performing the remote controlled movement of and the remote control server 105 or secondary information derived from information related to the communication quality. Examples of the direct information on communication quality include a throughput, a delay time, a jitter, a packet loss, a receive signal strength indication (RSSI), and the like. Examples of the secondary information derived from the information related to the communication quality include values mapped in a range from 0 to 1 in accordance with magnitudes of the throughput, the delay time, the jitter, the packet loss, and the RSSI. Examples of the secondary information derived from the information related to the communication quality include a probability that the semi-autonomous vehicle 101 can travel in accordance with the remote controlled traveling and a probability that the autonomous vehicle 101 is unable to travel in accordance with the remote controlled traveling, which are calculated on the basis of the values of the throughput, the delay time, the jitter, the packet loss, and the RSSI. The example of the communication quality information is merely an example, and any information may be used as long as the information is related to communication or derived from information related to communication.

The autonomous traveling difficulty level information holding program 1104 stores autonomous traveling difficulty levels associated with roads. The autonomous traveling difficulty level indicates information related to a difficulty level when the semi-autonomous vehicle 101 travels on a certain road in accordance with the autonomous traveling or secondary information derived from the information related to the difficulty level. For example, in a case in which the autonomous traveling is performed while recognizing a white line on a road, information related to the presence or absence of the white line or a density of the white line is the autonomous traveling difficulty level information. Further, a type of road is also the autonomous traveling difficulty level information. For example, in the case of expressways, the autonomous traveling difficulty level is considered to be low because a road width is wide, and there is no intersection. In the case of national roads, since there are intersections, the difficulty level is higher than that of the expressways. However, since traffic lights or the like are installed at the intersections of the national roads, it is possible to control a traveling start timing and a traveling stop timing by recognizing the traffic light when it travels at the intersection. Therefore, the autonomous traveling difficulty level of the national roads is considered to be relatively low. Examples of secondary information derived from the information related to the difficulty level include a probability that the autonomous traveling can be performed and a probability that the autonomous traveling is unable to be performed, which are derived from the presence or absence of the white line and the type of road. As the autonomous traveling difficulty level information, any information may be used as long as it is direct information related to the autonomous traveling difficulty level or secondary information derived from the autonomous traveling difficulty level.

The road map information held in the road map information holding program 1102, the communication quality information held in the communication quality information holding program 1103, and the autonomous traveling difficulty level information held in the autonomous traveling difficulty level information holding program 1104 may be updated. The information may be updated through communication via the network communication program 1108 and the communication device 304 as an updating method.

The unable-to-travel risk deciding program 1105 calculates an unable-to-travel risk of each road on the basis of the road map information held in the road map information holding program 1102, the communication quality information held in the communication quality information holding program 1103, and the autonomous traveling difficulty level information held in the autonomous traveling difficulty level holding program 1104, and outputs the unable-to-travel risk to the minimum unable-to-travel risk path deciding program 1106. The unable-to-travel risk indicates a possibility that the semi-autonomous vehicle 101 is unable to travel in accordance with any one method of the autonomous traveling and the remote controlled traveling. The unable-to-travel risk may be indicated by a probability.

The minimum unable-to-travel risk path deciding program 1106 calculates a path in which the unable-to-travel risk of each road is smallest among paths connecting two points on the basis of the unable-to-travel risk of each road input from the unable-to-travel risk deciding program 1105 and both of start point position information and end point position information on the road map held in the start point/end point holding program 1107, and transmits the calculated path to the semi-autonomous vehicle 101 via the network communication program 1108. The network communication program 1108 establishes a connection with the wide area network 104 via the communication device 1001. Here, the path indicates a set of roads.

Figure 12:
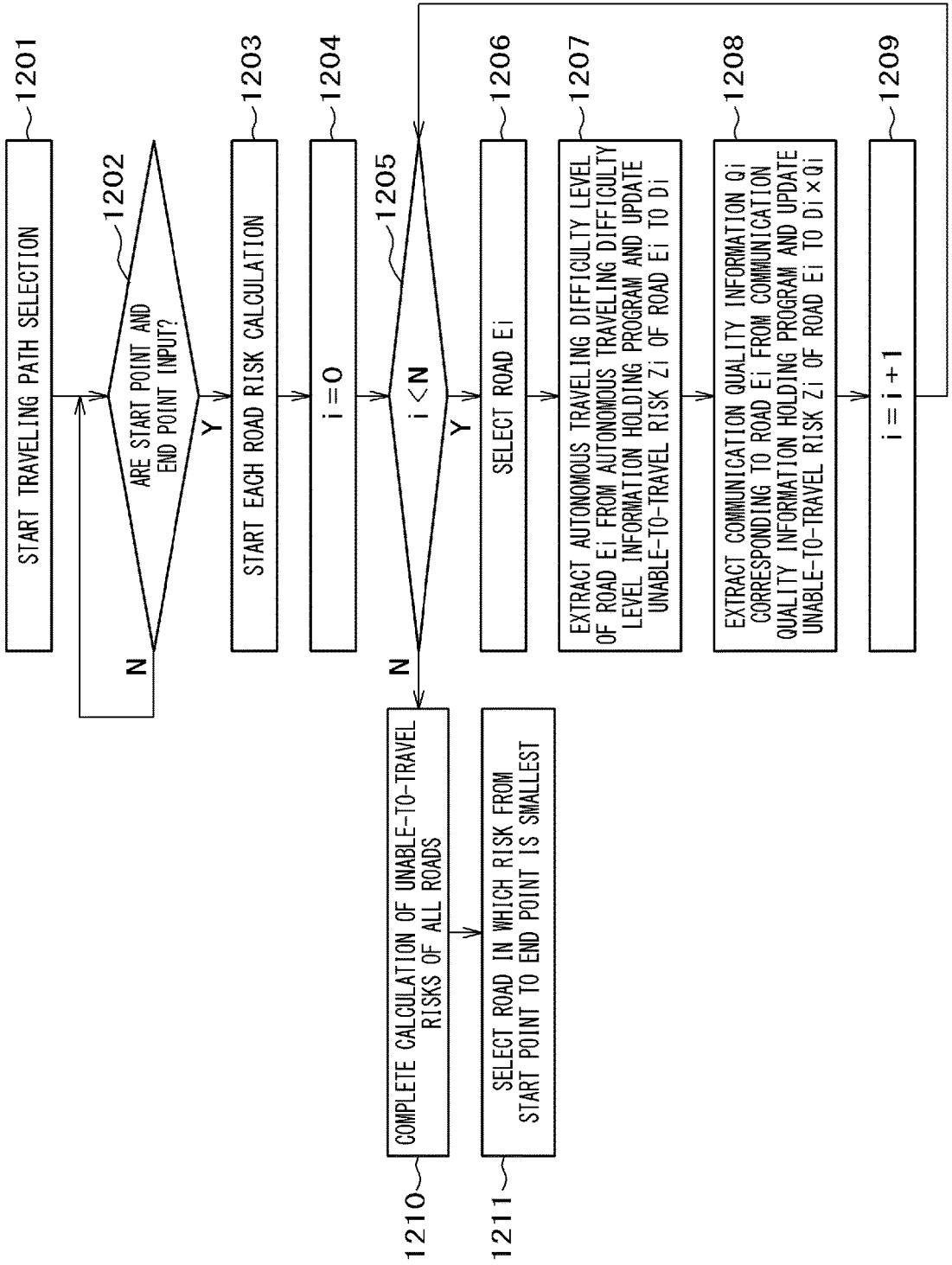
FIG. 12 is a flowchart of an operation of a traveling path deciding program.

FIG. 12 is a flowchart of an operation of the traveling path deciding program 1101. In a case in which traveling path selection starts (1201), the traveling path deciding program 1101 checks whether or not the start point and the end point are input (1202). In a case in which the start point and the end point are not input in step 1202 (N in 1202), the traveling path deciding program 1101 repeats step 1202. In a case in which the start point and the end point are input in step 1202 (Y in 1202), the traveling path deciding program 1101 starts calculating each road risk (1203) and sets i=0 (1204).

Then, the traveling path deciding program 1101 checks whether or not i<N is held (1205). Here, N indicates the number of roads described in the road map information. In a case in which i<N is not held (N in 1205), the traveling path deciding program 1101 completes the calculation of the unable-to-travel risk of all roads (1210) and proceeds to step 1211. In step 1211, the traveling path deciding program 1101 selects a path in which a sum of risks from the start point to the end point is smallest on the basis of the information of the start point and the end point and the unable-to-travel risk of each road (1211).

In a case in which i<N is held in step 1205 (Y in 1205), the traveling path deciding program 1101 proceeds to step 1206, and selects a road Ei in step 1206, and proceeds to step 1207. In step 1207, the traveling path deciding program 1101 extracts autonomous traveling difficulty level information Di of the road Ei held in the autonomous traveling difficulty level information holding program, updates an unable-to-travel risk Zi of the road Ei to Di, and proceeds to step 1208. In step 1208, the traveling path deciding program 1101 extracts communication quality information Qi corresponding to the road Ei held in the communication quality information holding program, updates the universal-to-travel risk Zi of the road Ei to Di×Qi, then proceeds to step 1209, executes i=i+1 in step 1209, and then returns to step 1205.

In step 1211, if each road is indicated by an edge in a graph theory, the unable-to-travel risk of each road is indicated by a weight of the edge, and a connection point between roads is indicated by a node, selection of a path with the smallest risk can be replaced with a shortest path problem in the graph theory. The shortest path problem in the graph theory can be solved by an algorithm such as a Dijkstra technique.

In the present embodiment, the example in which the traveling path deciding server 107 calculates the traveling path has been described, but, for example, the semi-autonomous vehicle 101 may calculate the traveling path, the remote control server may calculate the traveling path, or any other component may calculate the traveling path.

[Path Decision Method]

Figure 13:
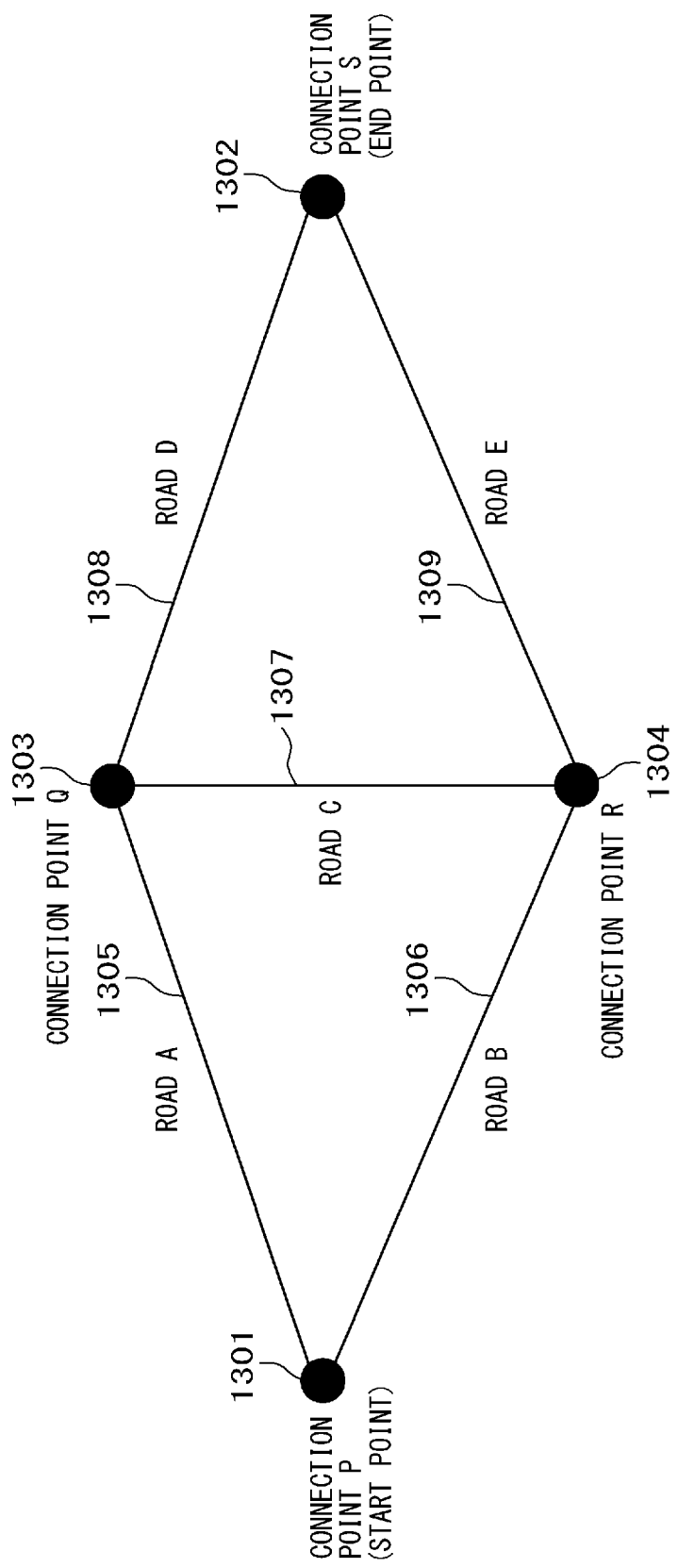
FIG. 13 is a diagram illustrating road map information.

A traveling path decision method will be described below using a specific example. FIG. 13 is a diagram illustrating the road map information. The road map information includes a connection point P (1301), a connection point S (1302), a connection point Q (1303), a connection point R (1304), a road A (1305), a road B (1306), a road C (1307), a road D (1308), and a road E (1309). The road A (1305) connects the connection point P (1301) with the connection point Q (1303). The road B (1306) connects the connection point P (1301) with the connection point R (1304). The road C (1307) connects the connection point Q (1303) with the connection point R (1304), and the road D (1308) connects the connection point Q (1303) with the connection point S (1302). The road A (1305) has the connection point P (1301) as the start point on the traveling path and has the connection point S (1305) as the end point on the traveling path.

The autonomous traveling release probability is used as the autonomous information difficulty level information held in the autonomous traveling difficulty level information holding program 1104. The autonomous traveling release probability indicates a probability that the autonomous traveling is released while the semi-autonomous vehicle 101 is performing the autonomous traveling. In other words, the autonomous traveling release probability can be regraded an autonomous traveling release risk indicating a possibility that the autonomous traveling is released. A remote controlled traveling release probability is used as the communication quality information held in the communication quality information holding program 1103. The remote controlled traveling release probability indicates a probability that the semi-autonomous vehicle 101 is unable to be remotely controlled during the remote controlled traveling. In other words, the remote controlled traveling release probability can be regarded as a remote controlled traveling release risk indicating a possibility that the remote controlled traveling is released. An unable-to-travel probability is used as the unable-to-travel risk calculated by the unable-to-travel risk deciding program 1105. The unable-to-travel probability indicates a probability that the semi-autonomous vehicle 101 is unable to perform either the autonomous traveling or the remote controlled traveling. In other words, the unable-to-travel probability can be regarded as an unable-to-travel risk indicating a possibility that both the autonomous traveling and the remote controlled traveling are released. FIG. 14 is a table illustrating road map information 1401. The road map information 1401 includes a road 1402, a connection point 1 (1403), and a connection point 2 (1404), and indicates a connection relation of each road. For example, a row 1405 in the table indicates that the road A (1305) connects the connection point P (1301) with the connection point Q (1303).

FIG. 15 is a table illustrating autonomous traveling difficulty level information 1501. In the table, a road 1502 is associated with an autonomous traveling release probability 1503. For example, row 1504 in the table indicates that the autonomous traveling release probability 1503 of the road A (1305) is 0.01.

FIG. 16 is a table illustrating communication quality information 1601. In the table, a remote controlled traveling release probability 1603 is associated with a road 1602. For example, a row 1604 in the table indicates that the remote controlled traveling release probability of the road A (1305) is 0.002.

FIG. 17 is a table illustrating unable-to-travel risk information 1701. A road 1702, a connection point 1 (1703), a connection point 2 (1704), and an unable-to-travel probability 1705 are associated with one another. For example, a row 1706 in the table indicates that the unable-to-travel probability 1705 of the road A (1305) having the connection points P (1301) and the connection point Q (1303) as both connection points is 0.00002. The unable-to-travel probability of 0.00002 is calculated by 0.01×0.002=0.00002 by multiplying the autonomous traveling release probability of 0.01 corresponding to the road A (1305) by the remote controlled traveling release probability of 0.002 corresponding to the road A (1604).

FIG. 18 illustrates a traveling path list 1801 from the start point P to the end point S in FIG. 13. The table includes a path number 1802, a road 1 (1803), a road 2 (1804), a road 3 (1805), and an unable-to-travel-on-road probability sum 1806. The path indicates a set of roads to travel from the start point P to the end point S. The path number 1802 is a number assigned to identify each path. The road 1 (1803) indicates a road to pass firstly in the path from the start point P to the end point S. The road 2 (804) indicates a road to pass secondly in the path from the start point P to the end point S. The road 3 (1805) indicates a road to pass thirdly in the path from the start point P to the end point S. The unable-to-travel-on-road probability sum 1806 indicates a sum of unable-to-travel probabilities of respective roads on the path. For example, 1808 indicates that a path identified by a path number 1 includes the road A (1305) and the road D (1308), the unable-to-travel-on-road probability is 00102 which is the sum of the unable-to-travel probability 0.00002 of the road A and the unable-to-travel probability of 0.001 of the road D. A path with the smallest unable-to-travel-on-road probability among the path numbers 1 to 4 is the path indicated by the path number 2 (1809), and the unable-to-travel-on-road probability is 0.00014.

The unable-to-travel risk of each road need not be necessary calculated each time the path from the start point to the end point is calculated. For example, the unable-to-travel risk of each road may be calculated only in a case in which the communication quality information held in the communication quality information holding program 1103 is updated. Alternatively, for example, the unable-to-travel risk of each road may be calculated only in a case in which the autonomous traveling difficulty level information held in the autonomous traveling difficulty level holding program 1104 is updated. The traveling path deciding program 1101 may execute only the process of selecting the path with the smallest unable-to-travel risk in a case in which the unable-to-travel risk of each road is calculated in advance.

[Autonomous Traveling Release Probability Derivation Method]

A specific example of deriving the autonomous traveling release probability will be described below with reference to FIGS. 19, 20, and 21. In the example, the autonomous traveling release probability is calculated on the basis of a road type and road white line information of each road.

FIG. 19 is a table illustrating road type information 1901 in which the road type is associated with the autonomous traveling release probability. This table includes a road type 1902 and an autonomous traveling release probability 1903. For example, a row 1904 in the table indicates that the autonomous traveling release probability is 0 in a case in which the road type 1902 is an expressway.

FIG. 20 is a table illustrating road white line cover ratio information 2001 in which a road white line cover ratio is associated with the autonomous traveling release probability. This table includes a road white line cover ratio 2002 and an autonomous traveling release probability 2003. For example, a row 2004 in the table indicates that the autonomous traveling release probability of the road having a road white line cover ratio of 100% is zero.

FIG. 21 is a table of obtaining the autonomous traveling release probability sum of each road on the basis of the road type information 1901 of FIG. 19 and the road white line cover ratio information 2001 of FIG. 20. The table includes a road 2102, a road type 2103, an autonomous traveling release probability 2104 corresponding to the road type, a white line cover ratio 2105, an autonomous traveling release probability 2106 corresponding to the white line cover ratio, and an autonomous traveling release probability sum 2107. For example, a row 2108 in the table indicates that the road type 2103 of the road A (1305) is a prefectural road, and the white line cover ratio 2105 is 65%. From FIG. 19, the autonomous traveling release probability corresponding to a case in which the road type is the prefectural road is 0.005. From FIG. 20, the autonomous traveling release probability is 0.005 in a case in which the white line cover ratio is 60%. Accordingly, the autonomous traveling release probability sum (2107) of the road A (1305) is 0.01 (=0.005+0.005).

As an example of a method of acquiring the white line cover ratio, it is possible to acquire the white line cover ratio of each road by causing an automobile equipped with a camera to travel. The semi-autonomous vehicle 101 may be used to acquire the white line cover ratio. As another example of a method of acquiring the white line cover ratio, there is a method of acquiring the white line cover ratio of each road from information photographed from a satellite equipped with a super high magnification camera. The white line cover ratio may be acquired by other methods. The road type can be acquired from information described in a general road traffic map.

The above example is an example of the autonomous traveling release probability derivation method, and the following examples can be used as other methods. If the number of travelings of the semi-autonomous vehicle 101 on a certain road Z in according to the autonomous traveling and the number of releases of the autonomous traveling while traveling on the road Z in accordance with the autonomous traveling are recorded, the autonomous traveling release probability can be calculated by the following formula.

Autonomous traveling release probability=the number of releases of the autonomous traveling while traveling on road Z in accordance with autonomous traveling÷the number of travelings on road Z according to autonomous traveling  (Formula 1)

[Remote Control Release Probability Derivation Method]

An example of a specific method of deriving the remote control release probability will be described below with reference to FIGS. 22, 23, and 24.

FIG. 22 is a table illustrating delay time information 2201 in which a delay time is associated with the remote controlled traveling release probability. The table includes a delay time 99% value (2202) and a remote controlled traveling release probability 2203. The delay time 99% value (2202) in the table is the maximum value among values falling within a range of 99% in the ascending order of the delay times in delay time measurement data of communication which is measured. For example, an example of a row 2204 in the table indicates that, in a case in which the delay time 99% value (2202) is less than 50 [ms], and the remote controlled traveling release probability (2203) is 0. In this example, the 99% value of the delay time is used, but other values such as an average value may be used.

FIG. 23 is a table illustrating throughput information 2301 in which a throughput is associated with the remote controlled traveling release probability. The table includes a throughput 99% value (2302) and a remote controlled traveling release probability 2303. The throughput 99% value (2302) in the table is the minimum value among values falling within a range of 99% in the descending order of the throughputs in throughput measurement data. For example, an example of a row 2304 in the table indicates that, in a case in which the throughput 99% value (2302) is 10 Mbps or more, and the remote controlled traveling release probability (2303) is 0.0001. In this example, the 99% value of the throughput is used, but other values such as an average value may be used.

FIG. 24 is a table in which the delay time and the throughput are associated with the remote controlled traveling release probability. The table includes a road 2402, a delay time 99% value (2403), a remote controlled traveling release probability 2404 corresponding to the delay time 99% value, a throughput 99% value (2405), a remote controlled traveling release probability 2406 corresponding to the throughput 99%, and a remote controlled traveling release probability sum 2407. For example, a row 2409 of the table indicates the delay time 99% value (2403) of the road A (1305) is 75 [ms] and the throughput 99% value (2405) is 8 [Mbps]. From FIG. 22, the remote controlled traveling release probability is 0.001 in a case in which the delay time 99% is 75 [ms]. From FIG. 23, the remote controlled traveling release probability is 0.001 in a case in which the throughput value 99% value is 8 [Mbps]. Accordingly, the remote controlled traveling release probability sum (2407) of the road A (1305) is 0.002 (=0.001+0.001).

The above example is an example of deriving the remote control release probability, and there is an example as another method. If the number of travelings of the semi-autonomous vehicle 101 on a certain road Z in according to the remote controlled traveling and the number of releases of the remote controlled traveling while traveling in accordance with the remote controlled traveling are recorded, the remote control release probability can be calculated by the following formula.

> Remote control release probability=the number of releases of the remote controlled traveling while traveling on road Z in accordance with remote controlled traveling÷the number of travelings on road Z according to remote controlled traveling (Formula 2)

Hereinafter, an example of a method of acquiring the delay time will be described with reference to FIGS. 25 and 26. A measurement wireless communication terminal located on a certain road can measure a delay time when communication is performed on each road by transmitting a measurement communication packet illustrated in FIG. 25 to a measurement server. The measurement wireless communication terminal is connected to the wireless base station 103. The measuring server is connected to the wide area network 104. The measurement wireless communication terminal and the measurement server communicate with each other via the wireless base station 103 and the wide area network 104.

Figure 25:
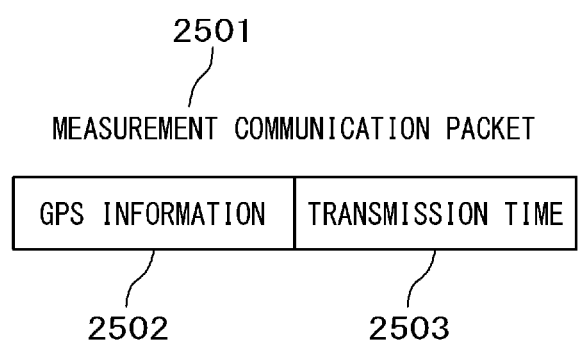
FIG. 25 is a diagram illustrating an example of a measurement communication packet.

The measurement communication packet illustrated in FIG. 25 includes GPS information 2502 and a transmission time 2503. The GPS information 2502 is information of a longitude and a latitude indicating a current position of the measurement wireless communication terminal. The transmission time 2503 stores a time at which the measurement wireless communication terminal transmits a measurement communication packet 2501. The measurement server records a reception time of the measurement communication packet 2501 received from the wireless communication terminal and can measure the delay time by calculating a difference between the transmission time 2503 stored in the measurement communication packet 2501 from the reception time. Further, the measurement server can detect a road corresponding to the measured delay time with reference to the GPS information 2502 stored in the measurement communication packet.

Figure 26:
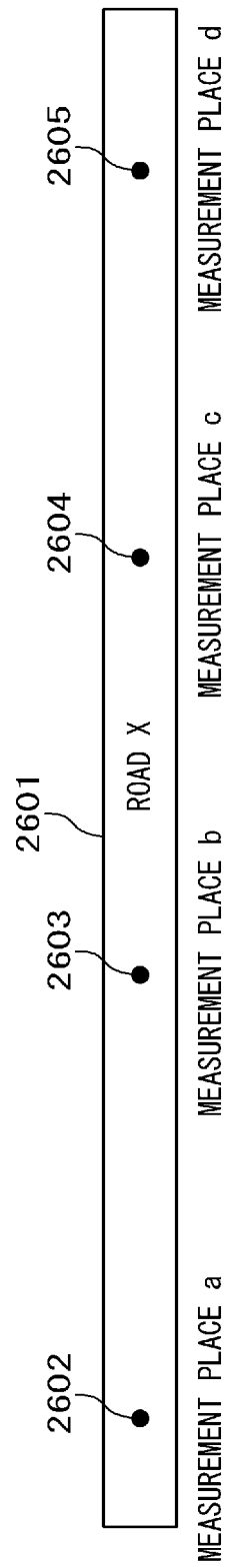
FIG. 26 is a diagram related to measurement of a delay time.

FIG. 26 is a diagram related to the measurement of the delay time. The measurement server can measurement a delay time associated with a road X by receiving the measurement communication packets 2501 transmitted from a plurality of positions on the road X (2601) (a measurement place a (2602), a measurement place b (2603), a measurement place c (2604), and a measurement place d (2605)). As the measurement wireless communication terminal, the wireless communication device 304 of the semi-autonomous vehicle 101 may be used. As the measurement server, a traveling path deciding server 107 or the remote control server 105 may be used.

Here, a configuration of the delay time will be described. The delay times are roughly classified into a delay time of an interval from the measurement wireless communication terminal to the wireless base station 103 and a delay time of an interval from the wireless base station 103 to the remote control server 105 via the wide area network 104. The wide area network 104 is mostly constituted by a high-speed wired communication network such as an optical line. Generally, wireless communication has a larger delay time than wired communication. Further, wireless communication has a larger delay time variation than wired communication. One of causes of the variation in the delay time is a change in a radio wave environment depending on a position relation between the wireless communication device 304 and the wireless base station 103. Accordingly, the measured delay time can be regarded as the measurement of the communication quality depending on the position of the road 102.

Next, an example of a throughput measurement method will be described. A measurement wireless communication terminal located on a certain road can measure a throughput when communication is performed on each road by transmitting a measurement communication packet illustrated in FIG. 25 to a measurement server. The measurement wireless communication terminal generates a communication packet corresponding to s communication speed in a case in which a communication scheme with the highest communication speed among communication schemes supported by the wireless base station 103 is selected and transmits the measurement communication packet to a measurement server. The measurement server can measure the throughput from a total amount of measurement communication packets which are received in a certain period of time and include the same GPS information (communication packet size X number of received communication packets). For example, in a case in which the measurement server receives 375 1000-byte measurement packets bytes with the same GPS information during 0.3 seconds, the throughput at a certain point is 10 [Mbps] by the following Formula.

1000[Bytes]×8×375[packets]/0.3[seconds]=10[Mbps]  (Formula 3)

The throughputs are roughly classified into a throughput of an interval from the measurement wireless communication terminal to the wireless base station 103 and a throughput of an interval from the wireless base station 103 to the remote control server 105 via the wide area network 104. The wide area network 104 is mostly constituted by a high-speed wired communication network such as an optical line. Generally, wireless communication has a larger throughput than wired communication. Further, wireless communication has a larger throughput variation than wired communication. One of causes of the variation in the throughput is a change in a radio wave environment depending on a position relation between the wireless communication device 304 and the wireless base station 103. Accordingly, the throughput can be regarded as corresponding to the communication quality depending on the position of the road 102. As another throughput measurement method, for example, a pack train technique disclosed in Document ["Packet Trains-Measurements and a New Model for Computer Network Traffic," IEEE Journal on Selected Areas in Communication, Vol. SAC-4, No. 6, September 1986] may be used.

In the present embodiment, in the moving object traveling system including the three states, that is, the autonomous traveling, the remote controlled traveling, and the unable-to-travel state, a path with the smallest unable-to-travel probability can be selected.

Second Embodiment

Figure 27:
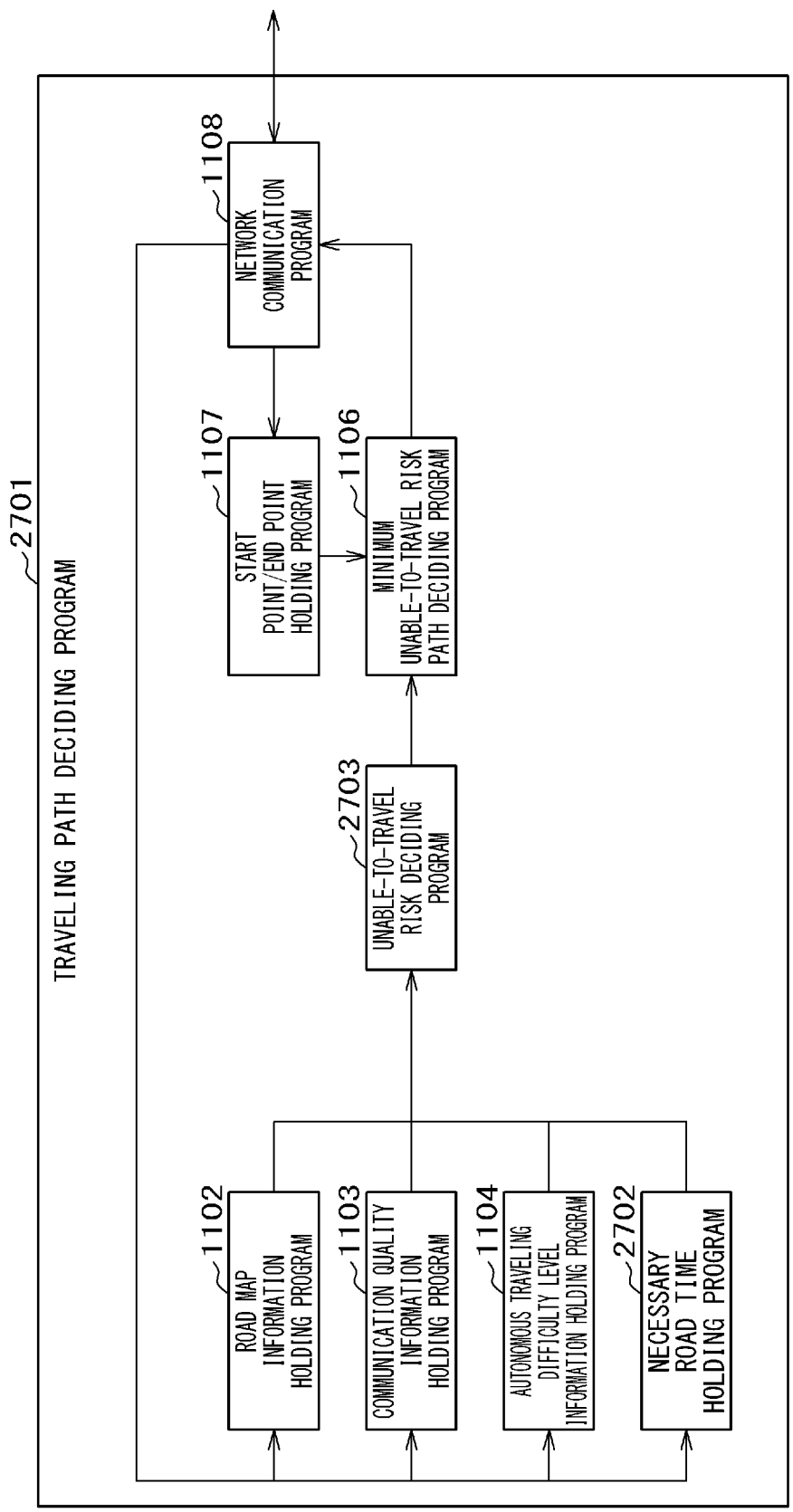
FIG. 27 is a functional block diagram of a traveling path deciding program.

The traveling path deciding program of the present embodiment is illustrated in FIG. 27. In FIG. 27, programs corresponding to the programs in FIG. 11 are denoted by the same reference numerals. A necessary road time holding program 2702 outputs necessary road time information 2801 which is a time necessary for traveling on each road to an unable-to-travel risk deciding program 2703. The unable-to-travel risk deciding program 2703 calculates the unable-to-travel risk of each road with reference to the universal traveling difficulty level information held in the road map holding program 1102, the communication quality information held in the communication quality holding program 1103, the autonomous traveling difficulty level information held in the autonomous traveling difficulty level holding program 1104, and the necessary road time information 2801 held in necessary road time holding program 2702, and outputs the unable-to-travel risk to the minimum unable-to-travel risk path deciding program 1106. The above-described process in the present embodiment is preferably performed, for example, before the process of step 1209 after the process of step 1208 illustrated in FIG. 12 ends.

FIG. 28 is a table illustrating the necessary road time information 2801 in which the road is associated with the necessary road time. The table includes a road 2802 and a necessary road time 2803. For example, a row 2804 in the table indicates that the necessary road time 2803 necessary for traveling on the road A is 10 [min]. As a traveling risk calculation method of the unable-to-travel risk deciding program 2703, the unable-to-travel risk may be calculated by multiplying the autonomous traveling release probability and the remote controlled traveling probability described in the first embodiment by the necessary road time. In the present embodiment, since the unable-to-travel risk is calculated with reference to the necessary road time in addition to the autonomous traveling release probability and the remote controlled traveling probability, a path which is small in the unable-to-travel probability but large in the necessary time is hardly selected.

In the present embodiment, the traveling path is decided using the necessary road time information, but the traveling path may be decided by using a necessary road distance which is a distance necessary for traveling on each road instead of the necessary road time information. For example, similarly to the necessary road time information 2801, necessary road distance information in which a road is associated with a necessary road distance may be held so that it can be understood that the necessary road distance necessary for traveling on the road A is 10 [km], and the traveling path may be decided using a similar technique.

In the present embodiment, in the moving object traveling system including the three states, that is, the autonomous traveling, the remote controlled traveling, and the unable-to-travel state, a path with the small unable-to-travel probability can be selected without increasing the necessary time up to the destination.

Third Embodiment

Figure 29:
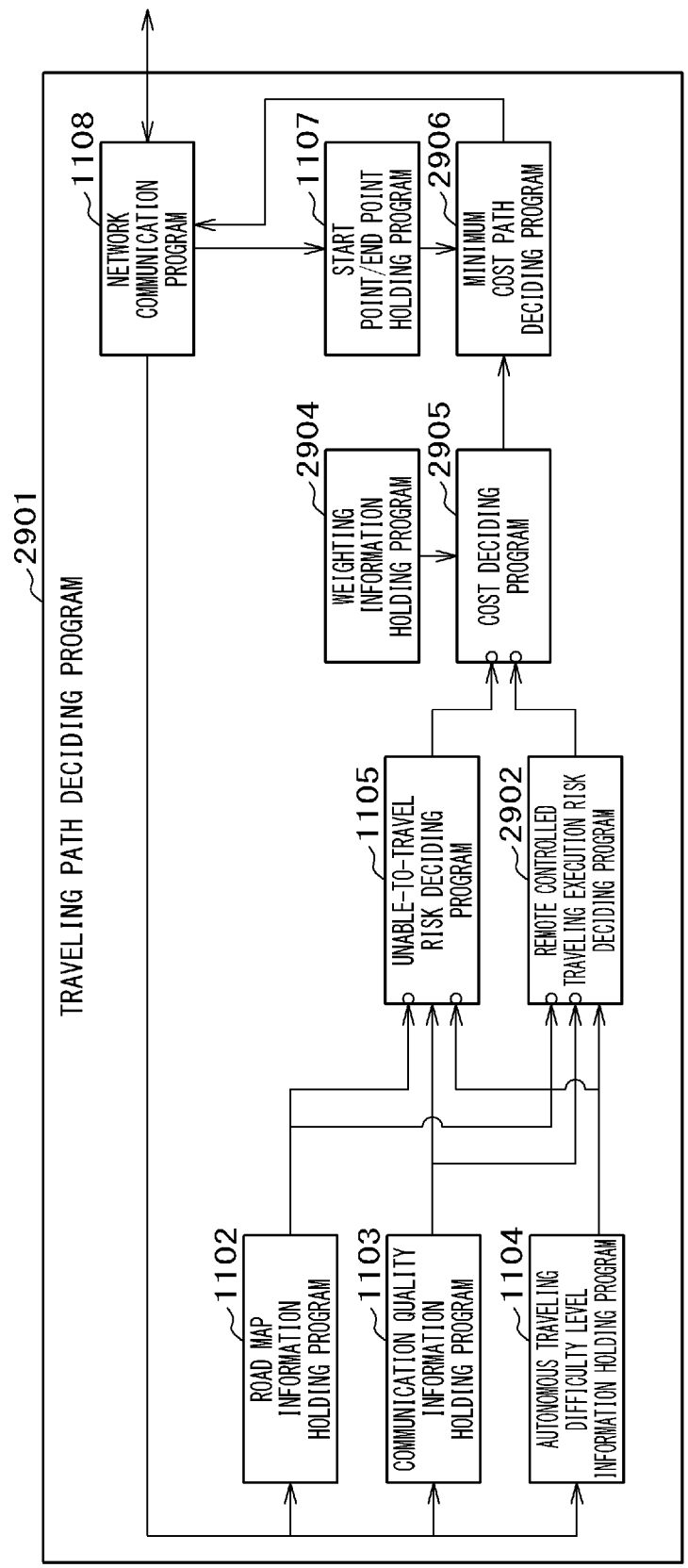
FIG. 29 is a functional block diagram of a traveling path deciding program.

A traveling path deciding program 2901 of the present embodiment is illustrated in FIG. 29. In FIG. 29, programs corresponding to the programs in FIG. 11 are denoted by the same reference numerals. A remote controlled traveling execution risk deciding program 2902 decides a remote controlled traveling execution risk on the basis of the road map information input from the road map information holding program 1102, the communication quality information input from the communication quality information holding program 1103, and the autonomous traveling difficulty level information input from the autonomous traveling difficulty level information holding program 1104. The remote driving execution risk indicates a probability that the remote controlled traveling is performed. A cost deciding program 2905 decides a cost of each road on the basis of the remote controlled traveling execution risk input from the remote controlled traveling execution risk deciding program 2902, the unable-to-travel risk input from the unable-to-travel risk deciding program 1105, and weighting information input from a weighting information holding program 2904, and outputs the cost to a minimum cost path deciding program 2906. The weighting information holding program 2904 holds the weighting information and outputs the weighting information to the cost deciding program 2905. The weighting information is information related to a cost necessary for performing the remote controlled traveling and a cost necessary for causing the semi-autonomous vehicle 101 in the unable-to-travel state to travel again.

An example of a method of deciding the remote control execution risk through the remote controlled traveling execution risk deciding program 2902 will be described. In a case in which the remote controlled traveling is performed, it is a state in which the autonomous traveling is released, and the remote controlled traveling can be performed. Therefore, a probability of traveling according to the remote controlled traveling is indicated by the following Formula. A remote controlled traveling execution probability to be described below can be regarded as a remote control risk indicating a possibility of switching to the remote control.

Remote controlled traveling execution probability=autonomous traveling release probability×(1−remote controlled traveling release probability)     (Formula 4)

The cost of each road is calculated by the following Formula.

Cost=remote controlled traveling execution probability×weight of remote controlled traveling cost+ unable-to-travel probability × weight of cost necessary for returning from unable-to-travel state     (Formula 5)

Here, the cost necessary for returning from the unable-to-travel state is a cost necessary for the field operator 108 to moves to a position of the semi-autonomous vehicle 101 in the unable-to-travel state and operate the semi-autonomous vehicle 101 to cause the semi-autonomous vehicle 101 to return to a state in which the autonomous traveling or the remote controlled traveling can be performed. A specific example of the cost calculation using the road map of FIG. 13, the road map information of FIG. 14, the autonomous traveling difficulty level information of FIG. 15, the communication quality information of FIG. 16, and the unable-to-travel risk information of FIG. 17 will be described below.

The remote controlled traveling execution risk deciding program 2902 calculates the remote driving execution risk from the road map information of FIG. 14, the autonomous traveling difficulty level information of FIG. 15, and the communication quality information of FIG. 16. The calculated remote controlled traveling execution risk is illustrated in FIG. 30. For example, the autonomous traveling release probability of the road A is 0.01 from a row 1504 in the table, and the remote controlled traveling release probability is 0.002. If the autonomous traveling release probability and the remote controlled traveling release probability are substituted into Formula (4), 0.00998 is obtained (a row 3006 in the table of FIG. 30). Here, as the weighting information here, a cost in a case in which the remote controlled traveling is performed is assumed to be 1, and a cost in a case in which it enters the unable-to-travel state is assumed to be 10. FIG. 31 illustrates a cost of each road in a case in which weighting is performed. In FIG. 31, it includes a road 3102, a connection point 1 (3103), a connection point 2 (3104), and a cost 3105. For example, the cost of the road A is 0.01018 (=0.00998×1+0.00002×10) from Formula (2). The minimum cost path deciding program 2906 decides a path whose sum of cost is smallest among paths from the start point to the end point on the basis of the start point/end point information input from the start point/end point holding program 1108 and the cost information input from the cost deciding program 2905. The above-described process in the present embodiment is preferably performed, for example, before the process of step 1209 after the process of step 1208 illustrated in FIG. 12 ends.

In a case in which the semi-autonomous traveling system is operated, while the semi-autonomous vehicle 101 is performing the autonomous traveling, the semi-autonomous vehicle 101 performs the autonomous traveling with no human assistance, and thus no human cost occurs. However, in a case in which the autonomous traveling is released, and the remote controlled traveling is performed, an operator who performs the remote control is necessary, and a human cost occurs. In a case in which the semi-autonomous vehicle 101 falls into the unable-to-travel state, in order to start traveling again, the field operator 108 from an operation management center or the like that manages an operation of the semi-autonomous vehicle 101 moves to the position of the semi-autonomous vehicle 101 and operates the semi-autonomous vehicle 101 to cause the semi-autonomous vehicle 101 to return to the state in which the autonomous traveling or the remote controlled traveling can be performed, and thus a human cost occurs. As described above, the human cost occurs both in a case in which the remote controlled traveling is performed and in a case in which it is in the unable-to-travel state. A human cost for performing the remote controlled traveling is assumed to differ from a human cost in the case of the unable-to-travel state. For example, since the semi-autonomous vehicle 101 basically performs the autonomous traveling, the remote controlled traveling is preferably performed secondarily until it returns to the state in which the autonomous traveling can be performed even when the remote controlled traveling is performed, and thus only a work of a short time is necessary. On the other hand, in a case in which it is in the unable-to-travel state, the filed operator 108 from the operation management center at the remote site performs an operation, and thus a larger cost is expected to be necessary than in a case in which the remote controlled traveling is performed.

In the present embodiment, in the moving object traveling system including the three states, that is, the autonomous traveling, the remote controlled traveling, and the unable-to-travel state, it is possible to provide a traveling path selection method in which the probability of the unable-to-travel state is reduced, and the human cost necessary for operating the system is minimized.

Fourth Embodiment

Figure 32:
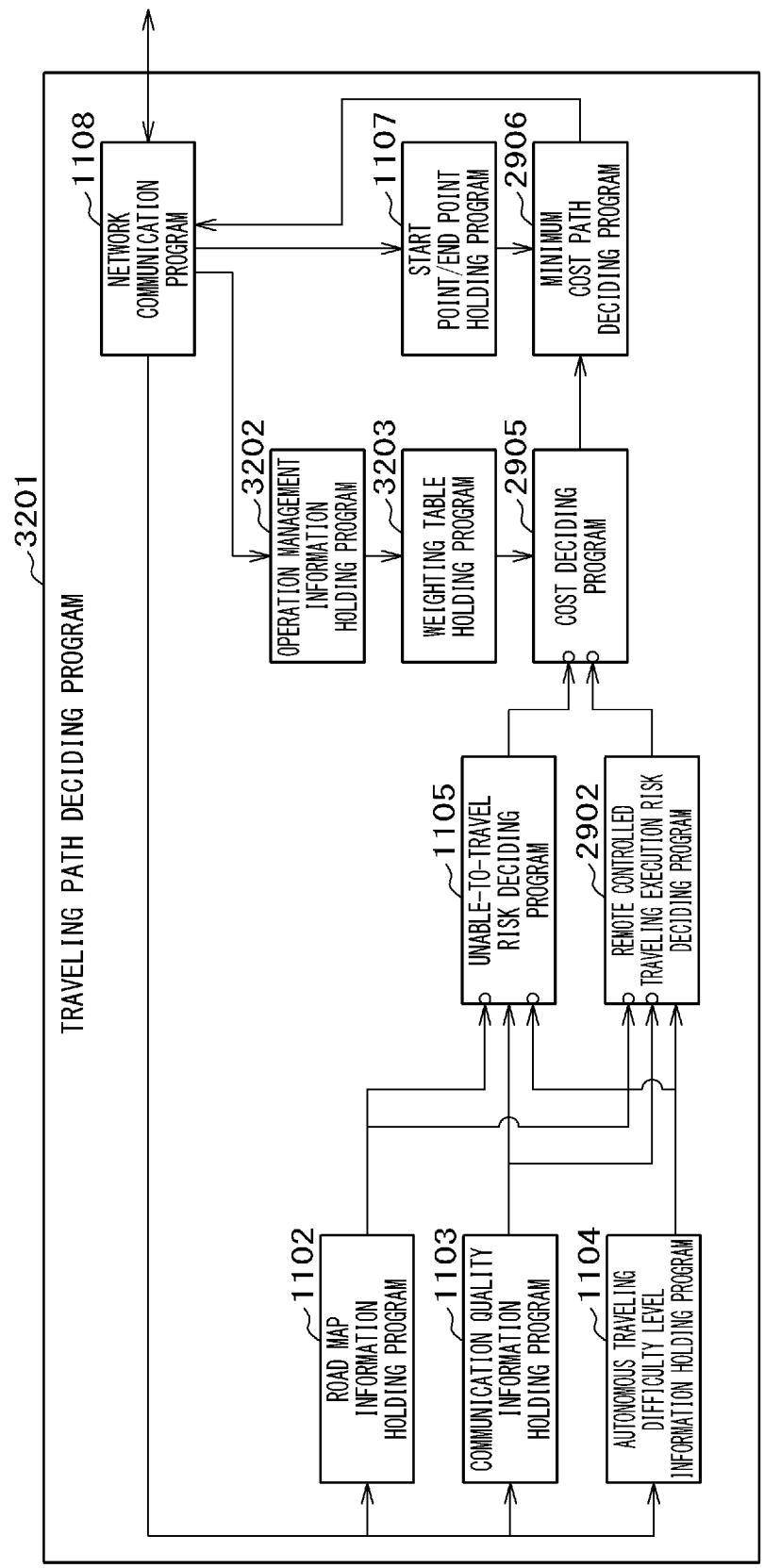
FIG. 32 is a functional block diagram of a traveling path deciding program.

A traveling path deciding program 3201 of the present embodiment is illustrated in FIG. 32. In FIG. 32, programs corresponding to the programs of FIG. 11 are denoted by the same reference numerals. An operation management information management program 3202 acquires operation management information via the network communication program 1108. The operation management information includes the number of semi-autonomous vehicles traveling in accordance with the remote controlled traveling and the number of semi-autonomous vehicles 101 in the unable-to-travel state in the semi-autonomous traveling system including a plurality of semi-autonomous vehicles 101. In other words, the operation management information can be regarded as information indicating a relation between the number of semi-autonomous vehicles 101 performing the remote controlled traveling and the number of semi-autonomous vehicles 101 in the unable-to-travel state. A weighting table holding program 3203 outputs weighting information to the cost deciding program 2905 from the operation management information input from the operation management information holding program 3202 and the weighting table held in the weighting table holding program 3203.

FIG. 33 illustrates an example of a weighting table 3301 held in the weighting table 3203. The weighting table 3301 includes operation management information 3302, a remote driving controlled traveling weighting 3303, and an unable-to-travel state weighting 3304. For example, in a row 3305 of the table, in a case in which the operation management information 3302 is "number of vehicles performing remote controlled traveling≤number of vehicles in unable-to-travel state×5," the remote driving navigation weighting is assumed to be 1, and the unable-to-travel state weighting is assumed to be 15. The above-described process in the present embodiment is preferably performed, for example, before the process of step 1209 after the process of step 1208 illustrated in FIG. 12 ends.

As the remote controlled traveling weighting decreases, a path having a high probability that the remote controlled traveling is performed out of the two states, that is, the remote controlled traveling and the unable-to-travel state is more likely to be selected. As unable-to-travel probability weighting decreases, a path with a high probability that it enters the unable-to-travel state is more likely to be selected. In the semi-autonomous traveling system, the remote operator 106 who performs the remote control in a case in which the autonomous traveling is released is necessary. Further, in a case in which the semi-autonomous vehicle 101 falls into the unable-to-travel state, the field operator 108 who goes to a site in which the semi-autonomous vehicle 101 is located and operates the semi-autonomous vehicle 101 in the unable-to-travel state is necessary. A certain number of remote operators 106 and a fixed number of field operators 108 are necessary to operate the semi-autonomous traveling system. In operating the semi-autonomous traveling system, an unbalanced state in which many semi-autonomous vehicles 101 are in the remote controlled traveling state, the remote operators are insufficient, and the semi-autonomous vehicle 101 in the unable-to-travel state is 0, and the field operators are left over occurs.

It is possible to eliminate the unbalanced state by deciding the weighting on the basis of the operation management information of the semi-autonomous vehicle 101. For example, in the situation in which the remote operators 106 are insufficient, and the field operators are left over, the weighting in the row 3305 in the table is selected, and thus the semi-autonomous vehicle 101 is likely to select a path which is high in the unable-to-travel probability rather than the probability of the remote control. Therefore, it is possible to eliminate the imbalance between the number of remote operators 106 and the number of field operators 108.

In the present embodiment, the number of semi-autonomous vehicles 101 in the remote controlled traveling state and the number of semi-autonomous vehicles 101 in the unable-to-travel state are used as the operation management information, but any information can be used as long as it is information related to the operation management of the semi-autonomous traveling system. For example, the operation management information may include the number of remote operators 106 and the number of field operators 108. In this case, the operation management information can be regarded as information indicating a relation between the number of persons that moves the semi-autonomous vehicle 101 through the remote control and the number of persons who operate the semi-autonomous vehicle 101 in the field. Further, for example, the operation management information may include the number of persons who perform the remote control among the remote operators 106 and the number of persons who perform an operation in the field among the field operators 108. Further, the operation management information may include some or all of the information described above.

In the present embodiment, in the moving object traveling system including the three states, that is, the autonomous traveling, the remote controlled traveling, and the unable-to-travel state, it is possible to reduce the possibility of the unable-to-travel state. Further, in the present embodiment, the number of vehicles in the remote controlled traveling state and the number of vehicles in the unable-to-travel state are held at a fixed rate, and thus it is possible to provide the traveling path selection method in which the semi-autonomous traveling system can be operated by a minimum number of persons.

Fifth Embodiment

The present embodiment relates to a traveling path deciding program in which the road map information holding unit in the traveling path deciding program of the second embodiment is added to the traveling path deciding program of the third embodiment.

Figure 34:
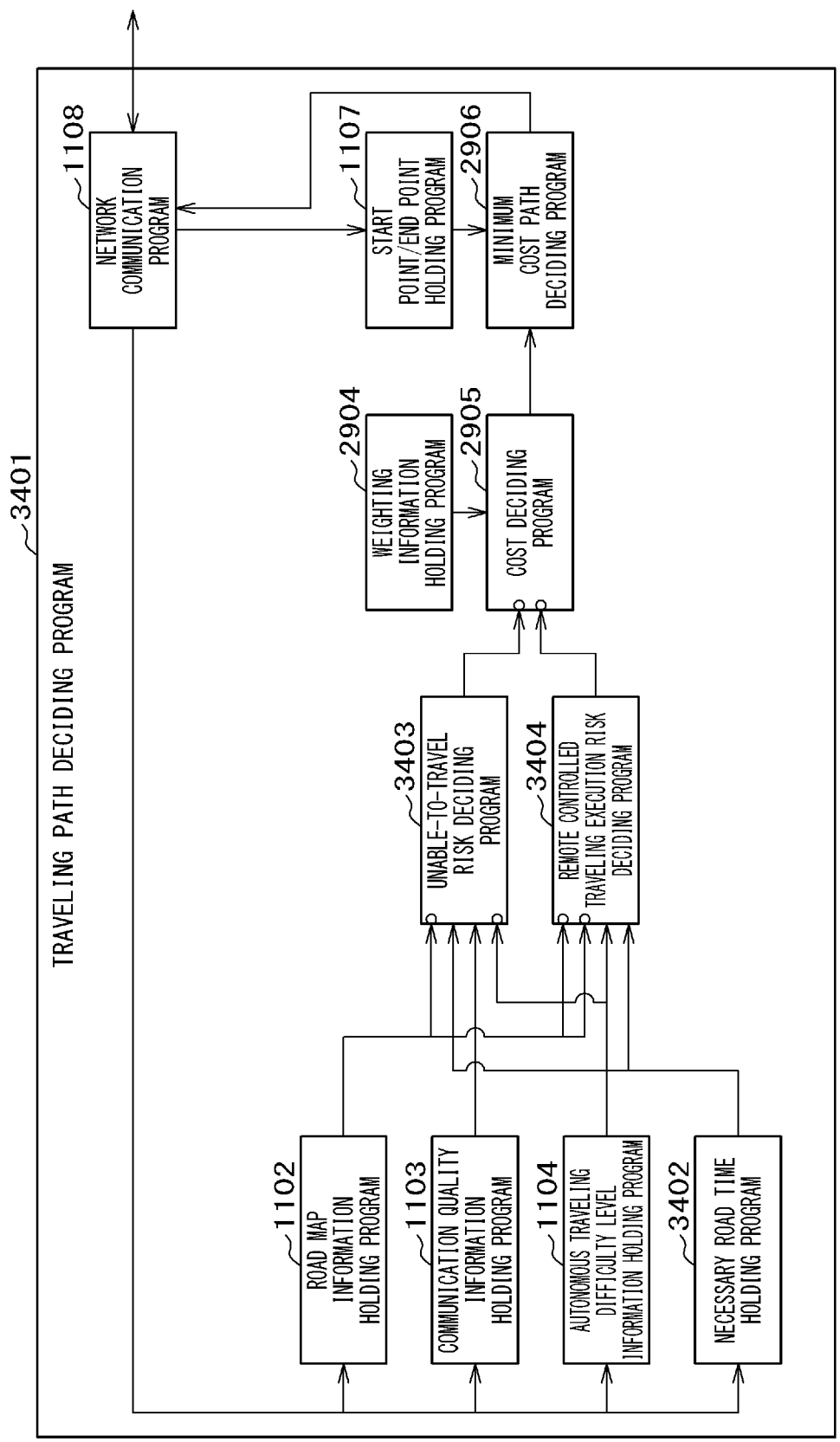
FIG. 34 is a functional block diagram of a traveling path deciding program.

A traveling path deciding program 3401 of the present embodiment is illustrated in FIG. 34. In FIG. 34, programs corresponding to the programs of FIG. 29 are denoted by the same reference numerals. A necessary road time holding program 3402 inputs necessary road time information which is a time necessary for traveling on each road to an unable-to-travel risk deciding program 3403 and a remote controlled traveling execution risk deciding program 3404. The unable-to-travel risk deciding program 3403 calculates the unable-to-travel risk of each road with reference to the universal traveling difficulty level information held in the road map holding program 1102, the communication quality information held in the communication quality holding program 1103, the autonomous traveling difficulty level information held in the autonomous traveling difficulty level holding program 1104, and the necessary road time information held in necessary road time holding program 3402, and outputs the unable-to-travel risk to the cost deciding program 2905.

The remote controlled traveling execution risk deciding program 3404 calculates the remote controlled traveling execution risk of each road with reference to the road map information held in the road map holding unit 1102, the communication quality information held in the communication quality holding program 1103, the autonomous traveling difficulty level information held in the autonomous traveling difficulty level holding program 1104, and the necessary road time information held in the necessary road time holding program 3402, and inputs the remote controlled traveling execution risk to the cost deciding program 2905. The above-described process in the present embodi-ment is preferably performed, for example, before the process of step 1209 after the process of step 1208 illustrated in FIG. 12 ends.

In the present embodiment, in the moving object traveling system including the three states, that is, the autonomous traveling, the remote controlled traveling, and the unable-to-travel state, it is possible to provide a traveling path selection method in which the probability of the unable-to-travel state is reduced, and the human cost necessary for operating the system is minimized without increasing the necessary time to the destination.

Sixth Embodiment

The present embodiment relates to a traveling path deciding program in which the road map information holding program in the traveling path deciding program of the second embodiment is added to the traveling path deciding program of the fourth embodiment.

Figure 35:
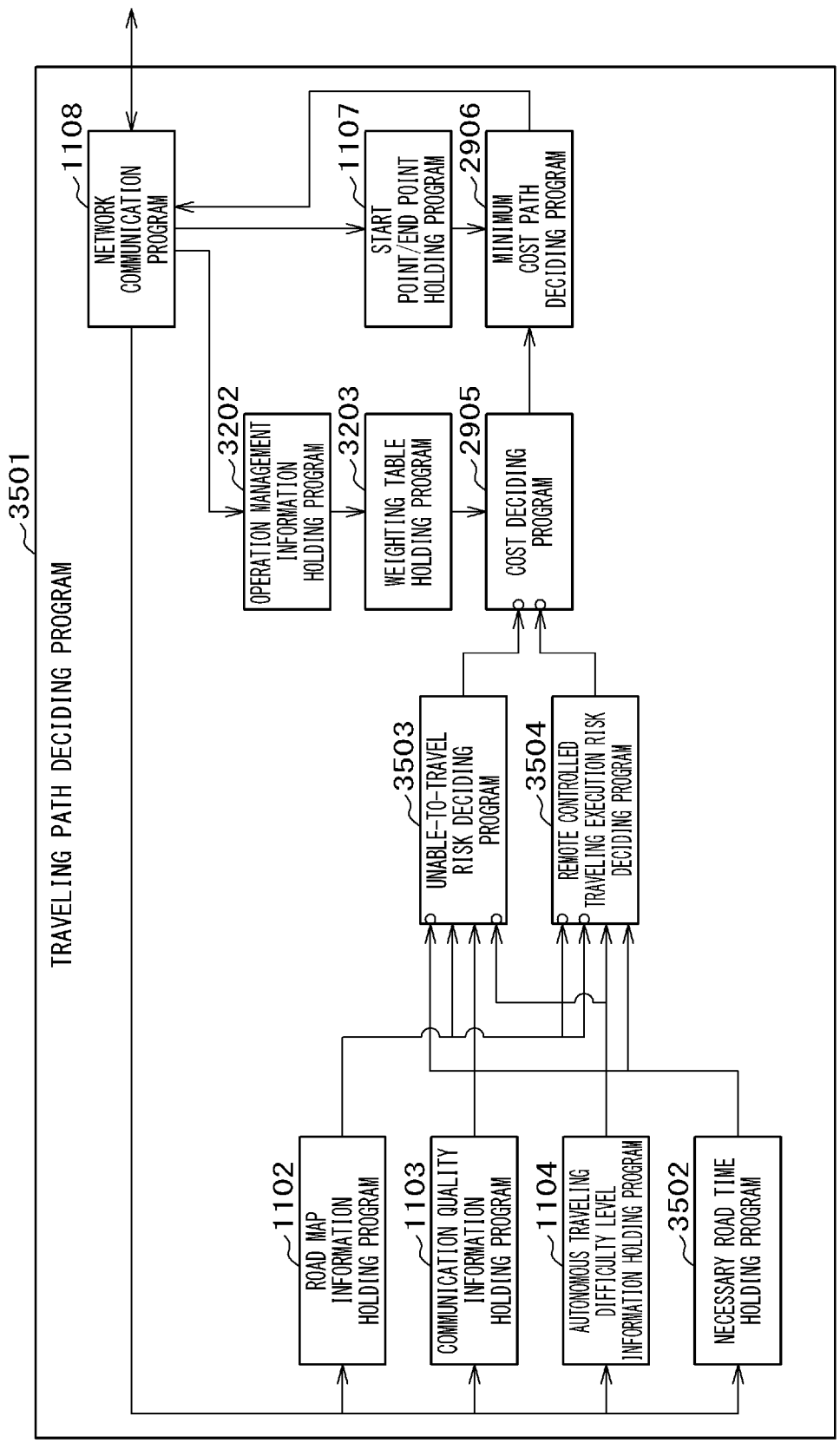
FIG. 35 is a functional block diagram of a traveling path deciding program.

A traveling path deciding program 3501 of the present embodiment is illustrated in FIG. 35. In FIG. 35, programs corresponding to the programs of FIG. 32 are denoted by the same reference numerals. A necessary road time holding program 3502 outputs necessary road time information which is a time necessary for traveling on each road to an unable-to-travel risk deciding program 3503 and a remote controlled traveling execution risk deciding program 3504. The unable-to-travel risk deciding program 3503 calculates the unable-to-travel risk of each road with reference to the universal traveling difficulty level information held in the road map holding program 1102, the communication quality information held in the communication quality holding program 1103, the autonomous traveling difficulty level information held in the autonomous traveling difficulty level holding program 1104, and the necessary road time information held in necessary road time holding program 3502, and outputs the unable-to-travel risk to the cost deciding program 2905. The remote controlled traveling execution risk deciding program 3504 calculates the remote controlled traveling execution risk of each road with reference to the road map information held in the road map holding unit 1102, the communication quality information held in the communication quality holding program 1103, the autonomous traveling difficulty level information held in the autonomous traveling difficulty level holding program 1104, and the necessary road time information held in the necessary road time holding program 3502, and inputs the remote controlled traveling execution risk to the cost deciding program 2905. The above-described process in the present embodiment is preferably performed, for example, before the process of step 1209 after the process of step 1208 illustrated in FIG. 12 ends.

In the present embodiment, in the moving object traveling system including the three states, that is, the autonomous traveling, the remote controlled traveling, and the unable-to-travel state, it is possible to reduce the probability of the unable-to-travel state without increasing the necessary time to the destination. Further, in the present embodiment, the number of vehicles in the remote controlled traveling state and the number of vehicles in the unable-to-travel state are held at a fixed rate, and thus it is possible to provide the traveling path selection method in which the semi-autonomous traveling system can be operated by a minimum number of persons.

REFERENCE SIGNS LIST

101 semi-autonomous vehicle
102 road 103 wireless base station
104 wide area network
105 remote control server
106 remote operator
107 traveling path deciding server
108 field operator
201 autonomous traveling state
202 remote controlled traveling state
203 unable-to-travel state
204 state transition from autonomous traveling state to remote controlled traveling state
205 state transition from remote controlled traveling state to autonomous traveling state
206 state transition from remote controlled traveling state to unable-to-travel state
207 state transition from unable-to-travel state to remote controlled traveling state
208 state transition from unable-to-travel state to autonomous traveling state
301 sensor
302 information processing device
303 input/output device
304 wireless communication device
306 traveling control device
307 camera
309 millimeter wave radar
310 GPS
311 auxiliary storage device
312 main storage device
313 operation processing device
314 display device
315 steering
316 accelerator pedal
317 brake pedal
401 autonomous traveling control program
402 sensor input unit
403 autonomous traveling determining unit
404 remote control execution command generating unit
405 network communication unit
406 traveling path holding unit
407 control command generating unit
408 control command output unit
501 remote controlled traveling server program
502 control command output unit
503 network communication unit
504 traveling stop command output unit
701 communication device
702 information processing device
703 remote control input/output device
704 auxiliary storage device
705 main storage device
706 operation processing device
707 display device
708 steering
709 accelerator pedal
710 brake pedal
801 remote controlled traveling client program
802 information display unit
803 control command input unit
804 network communication unit
1001 communication device
1002 information processing device
1003 auxiliary storage device
1004 main storage device
1005 operation processing device
1101 traveling path deciding program
1102 road map information holding unit
1103 communication quality information holding unit
1104 autonomous traveling difficulty level information holding unit
1105 unable-to-travel risk deciding unit
1106 minimum unable-to-travel risk path deciding unit
1107 start point/end point holding unit
1108 network communication unit
1301 connection point P (start point)
1302 connection point S (end point)
1303 connection point Q
1304 connection point R
1305 road A
1306 road B
1307 road C
1308 road D
1309 road E
1401 road map information
1402 road
1403 connection point 1
1404 connection point 2
1501 autonomous traveling difficulty level information
1502 road
1503 autonomous traveling release probability
1601 communication quality information
1602 road
1603 remote controlled traveling release probability
1701 unable-to-travel risk information
1702 road
1703 connection point 1
1704 connection point 2
1705 unable-to-travel probability
1801 traveling path list
1802 path number
1803 road 1
1804 road 2
1805 road 3
1806 unable-to-travel-on-road probability sum
1901 road type information
1902 road type
1903 autonomous traveling release probability
2001 road white line
2002 road white line cover ratio
2003 autonomous traveling release probability
2101 calculation of autonomous traveling difficulty level on the basis of road type and road white line information
2102 road
2103 road type
2104 autonomous traveling release probability corresponding to road type
2105 white line cover ratio
2106 autonomous traveling release probability corresponding to white line cover ratio
2107 sum of autonomous traveling release probability
2201 delay time information
2202 delay time 99% value
2203 remote controlled traveling release probability
2301 throughput information
2302 throughput 99% value
2303 remote controlled traveling release probability
2401 calculation of remote controlled traveling release probability on the basis of delay time and throughput
2402 road
2403 delay time 99% value
2404 remote controlled traveling release probability corresponding to delay time 99% value
2405 throughput 99% value 2406 remote controlled traveling release probability corresponding to throughput 99% value
2407 sum of remote controlled traveling release probability
2501 measurement communication packet
2502 GPS information
2503 transmission time
2601 road X
2602 measurement place a
2603 measurement place b
2604 measurement place c
2605 measurement place d
2701 traveling path deciding program
2702 necessary road time holding program
2703 unable-to-travel risk deciding unit
2801 necessary road time information
2802 road
2803 necessary road time
2901 traveling path deciding program
2902 remote controlled traveling execution risk deciding unit
2904 weighting information holding unit
2905 cost deciding unit
2906 minimum cost path deciding unit
3001 remote controlled traveling execution risk information
3002 road
3003 connection point 1
3004 connection point 2
3005 unable-to-travel probability
3101 cost information
3102 road
3103 connection point 1
3104 connection point 2
3105 cost
3201 traveling path deciding program
3202 operation management information holding unit
3203 weighting table holding unit
3301 weighting table
3302 operation management information
3303 weighting of remote controlled traveling
3304 weighting of unable-to-travel state
3401 traveling path deciding program
3402 necessary road time holding unit
3403 unable-to-travel risk deciding unit
3404 remote controlled traveling execution risk deciding unit
3501 traveling path deciding program
3502 necessary road time holding unit
3503 unable-to-travel risk deciding unit
3504 remote controlled traveling execution risk deciding unit

The invention claimed is:

1. A moving object movement system, comprising:
a moving object that moves in accordance with any one method of autonomous movement or remote controlled movement;
a control server that is connected to the moving object via wireless communication; and
a traveling path deciding unit that calculates an unable-to-move risk indicating a possibility that movement is unable to be performed in accordance with any one method of the autonomous movement or the remote controlled movement on the basis of map information including movement paths of the moving object, autonomous movement difficulty level information indicating a difficulty level of the autonomous movement by the moving object, and communication quality information indicating a communication quality necessary for the moving object to perform the remote controlled movement, and decides a movement path in which the calculated unable-to-move risk is smallest among the movement paths.

2. The moving object movement system according to claim 1, wherein the traveling path deciding unit calculates a remote control risk indicating a possibility of switching to the remote controlled movement on the basis of an autonomous movement release risk indicating a possibility that the autonomous movement is released and a remote controlled movement release risk indicating a possibility that the remote controlled movement is released, calculates a cost weighted to the calculated remote control risk and the unable-to-move risk, and decides the movement path on the basis of the calculated cost.

3. The moving object movement system according to claim 2, wherein the traveling path deciding unit calculates the cost weighted to the unable-to-move risk and the remote control risk on the basis of operation management information of the moving object managed by the moving object movement system, and decides the movement path on the basis of the calculated cost.

4. The moving object movement system according to claim 3, wherein the traveling path deciding unit calculates the cost on the basis of the operation management information indicating a relation between the number of the moving objects performing the remote controlled movement and the number of the moving objects which are unable to move, and decides the movement path on the basis of the calculated cost.

5. The moving object movement system according to claim 3, wherein the traveling path deciding unit calculates the cost on the basis of the operation management information indicating a relation between the number of persons who move the moving object in accordance with the remote controlled movement and the number of persons who operate the moving object which is unable to move in a field, and decides the movement path on the basis of the calculated cost.

6. The moving object movement system according to claim 3, wherein the traveling path deciding unit calculates the cost on the basis of the operation management information indicating a relation between the number of the moving objects performing the remote controlled movement and the number of the moving objects which are unable to move and a relation between the number of persons who move the moving object in accordance with the remote controlled movement and the number of persons who operate the moving object which is unable to move in a field, and decides the movement path on the basis of the calculated cost.

7. The moving object movement system according to claim 1, wherein the traveling path deciding unit calculates the movement path on the basis of the calculated unable-to-move risk and either necessary time information indicating a time necessary for movement in the movement path or necessary distance information indicating a distance necessary for movement in the movement path.

8. The moving object movement system according to claim 1, wherein the traveling path deciding unit uses an autonomous movement release probability indicating a probability that the autonomous movement is released as the autonomous movement difficulty level information.

9. The moving object movement system according to claim 1, wherein the traveling path deciding unit uses a remote controlled movement release probability indicating a probability that the remote controlled movement is released as the communication quality information.

10. A movement path selection method performed in a moving object movement system including a moving object that moves in accordance with any one method of autonomous movement or remote controlled movement and a control server that is connected to the moving object via wireless communication, the movement path selection method comprising:
  calculating an unable-to-move risk indicating a possibility that movement is unable to be performed in accordance with any one method of the autonomous movement or the remote controlled movement on the basis of map information including movement paths of the moving object, autonomous movement difficulty level information indicating a difficulty level of the autonomous movement by the moving object, and communication quality information indicating a communication quality necessary for the moving object to perform the remote controlled movement; and
  deciding a movement path in which the calculated unable-to-move risk is smallest among the movement paths.

* * * * *